US011693979B2

(12) United States Patent
Biazetti et al.

(10) Patent No.: US 11,693,979 B2
(45) Date of Patent: Jul. 4, 2023

(54) DYNAMIC PERMISSION ASSIGNMENT AND ENFORCEMENT FOR TRANSPORT PROCESS

(71) Applicants: International Business Machines Corporation, Armonk, NY (US); GTD Solution Inc., Jersey City, NJ (US)

(72) Inventors: Ana C. Biazetti, Cary, NC (US); Craig Andrew Lanzen, Lambertville, MI (US); Dillon Dierker Lees, Holly Springs, NC (US); Aaron Lieber, Danville, CA (US); Nis David Nømark Jespersen, Copenhagen (DK); Thiago Rodrigues, Randolph, NJ (US)

(73) Assignees: International Business Machines Corporation, Armonk, NY (US); GTD Solution Inc., Jersey City, NJ (US)

( * ) Notice: Subject to any disclaimer, the term of this patent is extended or adjusted under 35 U.S.C. 154(b) by 816 days.

(21) Appl. No.: 16/698,911

(22) Filed: Nov. 27, 2019

(65) Prior Publication Data

US 2021/0157947 A1    May 27, 2021

(51) Int. Cl.
| | |
|---|---|
| *G06F 21/00* | (2013.01) |
| *G06F 21/62* | (2013.01) |
| *G06F 16/23* | (2019.01) |
| *G06Q 10/083* | (2023.01) |

(52) U.S. Cl.
CPC ...... *G06F 21/6218* (2013.01); *G06F 16/2315* (2019.01); *G06Q 10/0838* (2013.01)

(58) Field of Classification Search
CPC ............ G06F 21/6218; G06F 16/2315; G06Q 10/0838
See application file for complete search history.

(56) References Cited

U.S. PATENT DOCUMENTS

| | | | |
|---|---|---|---|
| 10,474,640 B1 * | 11/2019 | Roche, Jr. ............. | G06F 16/325 |
| 2019/0205884 A1 * | 7/2019 | Batra ..................... | G06Q 50/18 |
| 2021/0365570 A1 * | 11/2021 | Wong .................... | H04L 63/123 |

FOREIGN PATENT DOCUMENTS

| | | |
|---|---|---|
| CN | 107426157 A | 12/2017 |
| CN | 107909372 A | 4/2018 |
| CN | 108173850 A | 6/2018 |
| CN | 108632268 A | 10/2018 |
| CN | 108768988 A | 11/2018 |
| CN | 109872238 A | 6/2019 |
| WO | 2018119585 A1 | 7/2018 |

\* cited by examiner

*Primary Examiner* — Jeffrey C Pwu
*Assistant Examiner* — Thong P Truong

(57) ABSTRACT

An example operation may include one or more of receiving transport data of a multi-party transport process, identifying documents and events that are associated with the multi-party transport process based on the received transport data, dynamically determining read and write permissions for the documents and the events of the multi-party transport process based on predefined roles, and storing an identifier of the multi-party transport process and the dynamically determined read and write permissions in a block on a blockchain.

18 Claims, 22 Drawing Sheets

FIG. 4C

| Participant Type | Ocean Carrier | | | | Inland Transporter | | |
|---|---|---|---|---|---|---|---|
| Role | Ocean Carrier | TSB | Con-signor | Con-signee | Rail Operator | Truck Operator | Barge Operator |
| Invoice | N | N | Y | Y | N | N | Y |
| Packing List | Y | Y | Y | Y | Y | Y | Y |
| Booking Conf. | Y | Y | Y | Y | Y | N | N |
| Shipping Instructions | Y | Y | Y | Y | Y | N | N |
| Export Declaration | N | N | N | N | N | N | N |
| Bill of Lading | Y | Y | Y | Y | N | N | N |
| Sea Waybill | Y | Y | Y | N | Y | Y | N |
| Arrival Notice | Y | N | N | Y | N | N | Y |
| Import Declaration | N | N | N | N | N | N | N |
| Inspection Certificate | N | N | N | N | N | N | N |
| Origin Certificate | N | N | N | N | N | N | N |
| Dangerous Goods | Y | Y | Y | Y | Y | Y | Y |

450

452 — Participant Type

454 — Role

Documents 456

600

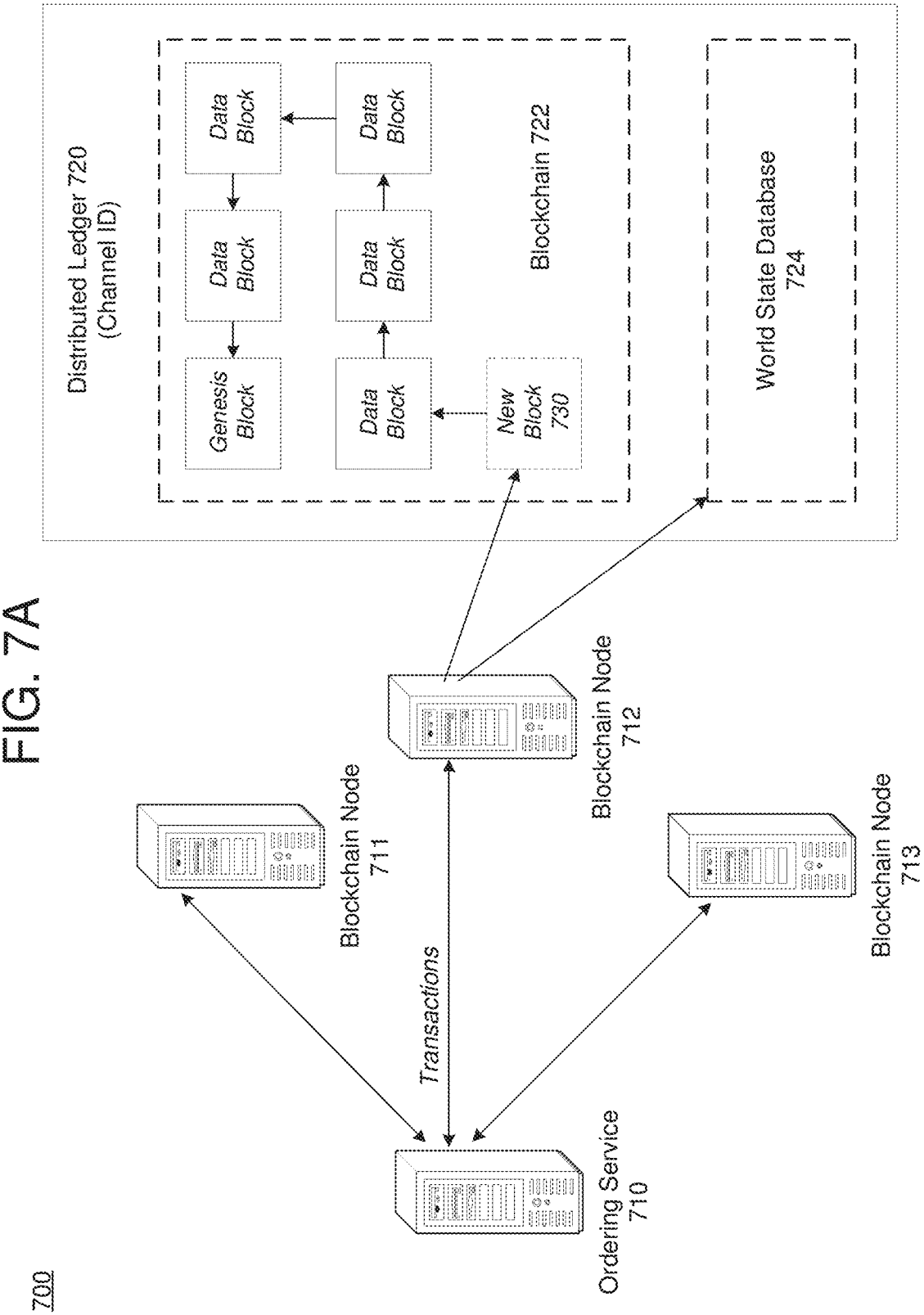

800

DYNAMIC PERMISSION ASSIGNMENT AND ENFORCEMENT FOR TRANSPORT PROCESS

TECHNICAL FIELD

This application generally relates to storing data on a blockchain, and more particularly, to a system which dynamically determines permissions of parties in a multi-party transport process based on roles and manages access to transport data based on the permissions.

BACKGROUND

A centralized database stores and maintains data in a single database (e.g., a database server) at one location. This location is often a central computer, for example, a desktop central processing unit (CPU), a server CPU, or a mainframe computer. Information stored on a centralized database is typically accessible from multiple different points. Multiple users or client workstations can work simultaneously on the centralized database, for example, based on a client/server configuration. A centralized database is easy to manage, maintain, and control, especially for purposes of security because of its single location. Within a centralized database, data redundancy is minimized because a given set of data only has one primary record.

However, a centralized database suffers from significant drawbacks. For example, a centralized database has a single point of failure if there are no fault-tolerance considerations. Therefore, if a hardware failure occurs (for example a hardware, firmware, and/or a software failure), all data within the database is lost and work of all users is interrupted. In addition, centralized databases are highly dependent on network connectivity. As a result, the slower the connection, the amount of time needed for each database access is increased. Another drawback is the occurrence of bottlenecks when a centralized database experiences high traffic due to a single location. Furthermore, a centralized database provides limited access to data because only one copy of the data is maintained by the database.

Organizations are recently turning to blockchain as a means for securely storing data that is not restricted by a central entity and that is accessible from multiple points. In a blockchain network, peers are responsible for collectively managing and storing data on the blockchain. The blockchain may be stored on a ledger which is distributed/replicated among the blockchain peers. Blockchain provides new mechanisms for securing the interactions of non-trusting parties through the use of a decentralized architecture.

Meanwhile, the shipping/transport ecosystem is a huge contributor to the global economy. For example, since the containerization revolution, the transport industry has grown to an amazing scale and encompasses ships/barges, trucks, trains, aircraft, and any other means for moving cargo from one geographical location to another. However, like most things of such size, the industry has developed significant inefficiencies and complexities. For example, communications between parties can be difficult since many parties do not deal directly with one another. In addition, parties have different priorities in most transactions, which creates contrasting goals/views. The transport process is also subject to fraud and wasted time/resources, especially since paper-based documents are still relied on for proof. As such, what is needed is a solution that overcomes these drawbacks and limitations.

SUMMARY

One example embodiment provides a system that includes one or more of a network interface configured to receive transport data of a multi-party transport process, and a processor configured to one or more of identify documents and events that are associated with the multi-party transport process based on the received transport data, dynamically determine read and write permissions for the documents and the events of the multi-party transport process based on predefined roles, and store an identifier of the multi-party transport process and the dynamically determined read and write permissions in a block on a blockchain.

Another example embodiment provides a method that includes one or more of receiving transport data of a multi-party transport process, identifying documents and events that are associated with the multi-party transport process based on the received transport data, dynamically determining read and write permissions for the documents and the events of the multi-party transport process based on predefined roles, and storing an identifier of the multi-party transport process and the dynamically determined read and write permissions in a block on a blockchain.

A further example embodiment provides a non-transitory computer-readable medium comprising instructions, that when read by a processor, cause the processor to perform one or more of receiving transport data of a multi-party transport process, identifying documents and events that are associated with the multi-party transport process based on the received transport data, dynamically determining read and write permissions for the documents and the events of the multi-party transport process based on predefined roles, and storing an identifier of the multi-party transport process and the dynamically determined read and write permissions in a block on a blockchain.

BRIEF DESCRIPTION OF THE DRAWINGS

FIG. 4C is a diagram that illustrates a table storing access rights to documents based on roles according to example embodiments.

FIG. 7A is a diagram that illustrates a process of a new block being added to a distributed ledger, according to example embodiments.

DETAILED DESCRIPTION

Figure 1:
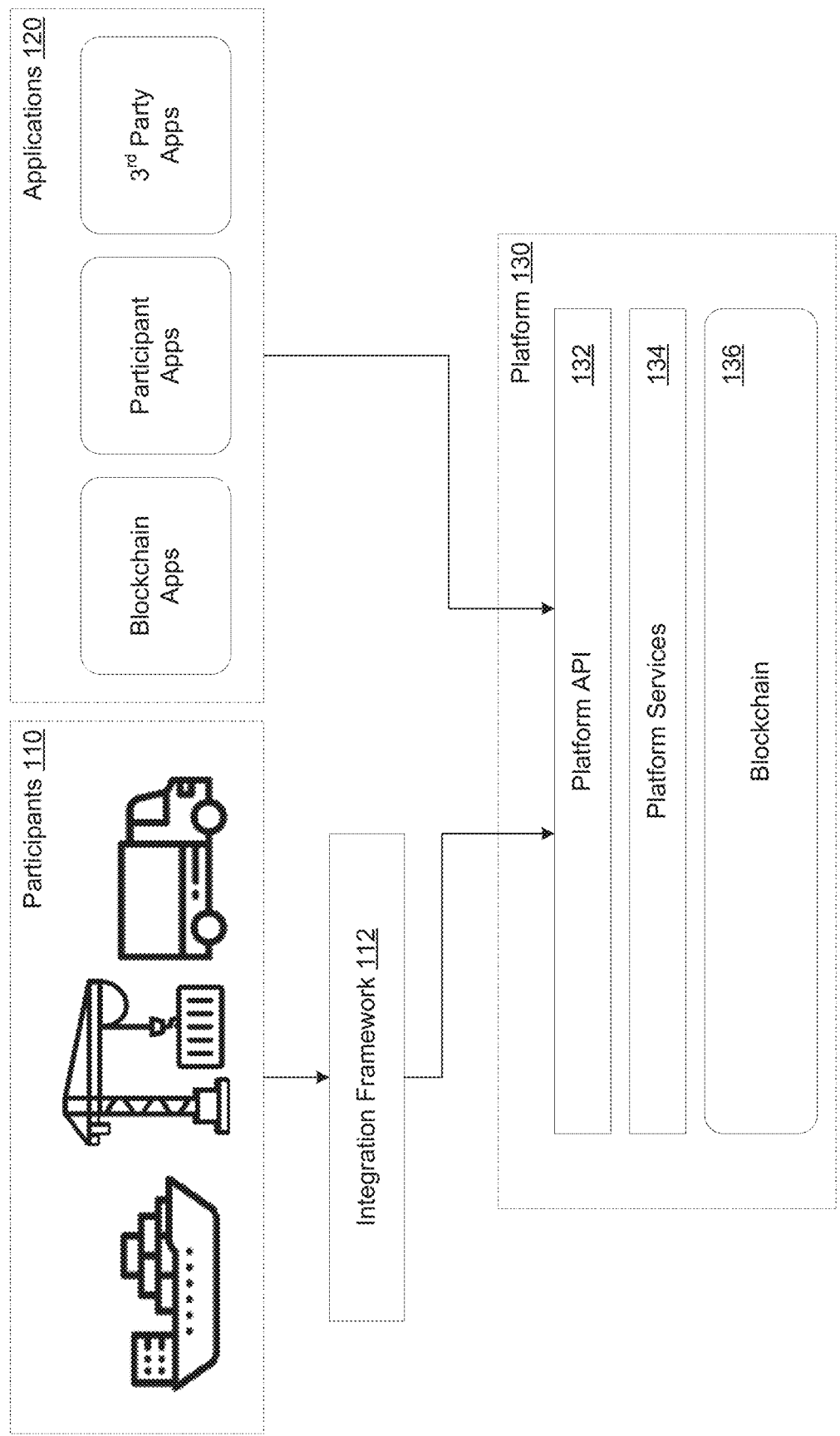
FIG. 1 is a diagram that illustrates a trade ecosystem for managing the transport of cargo and its associated milestones (events and documents) according to example embodiments.

It will be readily understood that the instant components, as generally described and illustrated in the figures herein, may be arranged and designed in a wide variety of different configurations. Thus, the following detailed description of the embodiments of at least one of a method, apparatus, non-transitory computer readable medium and system, as represented in the attached figures, is not intended to limit the scope of the application as claimed but is merely representative of selected embodiments.

The instant features, structures, or characteristics as described throughout this specification may be combined or removed in any suitable manner in one or more embodiments. For example, the usage of the phrases "example embodiments", "some embodiments", or other similar language, throughout this specification refers to the fact that a particular feature, structure, or characteristic described in connection with the embodiment may be included in at least one embodiment. Thus, appearances of the phrases "example embodiments", "in some embodiments", "in other embodiments", or other similar language, throughout this specification do not necessarily all refer to the same group of embodiments, and the described features, structures, or characteristics may be combined or removed in any suitable manner in one or more embodiments. Further, in the diagrams, any connection between elements can permit one-way and/or two-way communication even if the depicted connection is a one-way or two-way arrow. Also, any device depicted in the drawings can be a different device. For example, if a mobile device is shown sending information, a wired device could also be used to send the information.

In addition, while the term "message" may have been used in the description of embodiments, the application may be applied to many types of networks and data. Furthermore, while certain types of connections, messages, and signaling may be depicted in exemplary embodiments, the application is not limited to a certain type of connection, message, and signaling.

Example embodiments provide methods, systems, components, non-transitory computer readable media, devices, and/or networks, for dynamically determining read and write permissions to data of a multi-party transport process, and controlling access to the data based on dynamically determined permissions via blockchain.

In one embodiment the application utilizes a decentralized database (such as a blockchain) that is a distributed storage system, which includes multiple nodes that communicate with each other. The decentralized database includes an append-only immutable data structure resembling a distributed ledger capable of maintaining records between mutually untrusted parties. The untrusted parties are referred to herein as peers or peer nodes. Each peer maintains a copy of the database records and no single peer can modify the database records without a consensus being reached among the distributed peers. For example, the peers may execute a consensus protocol to validate blockchain storage transactions, group the storage transactions into blocks, and build a hash chain over the blocks. This process forms the ledger by ordering the storage transactions, as is necessary, for consistency. In various embodiments, a permissioned and/or a permissionless blockchain can be used. In a public or permission-less blockchain, anyone can participate without a specific identity. Public blockchains can involve native cryptocurrency and use consensus based on various protocols such as Proof of Work (PoW). On the other hand, a permissioned blockchain database provides secure interactions among a group of entities which share a common goal but which do not fully trust one another, such as businesses that exchange funds, goods, information, and the like.

This application can utilize a blockchain that operates arbitrary, programmable logic, tailored to a decentralized storage scheme and referred to as "smart contracts" or "chaincodes." In some cases, specialized chaincodes may exist for management functions and parameters which are referred to as system chaincode. The application can further utilize smart contracts that are trusted distributed applications which leverage tamper-proof properties of the blockchain database and an underlying agreement between nodes, which is referred to as an endorsement or endorsement policy. Blockchain transactions associated with this application can be "endorsed" before being committed to the blockchain while transactions, which are not endorsed, are disregarded. An endorsement policy allows chaincode to specify endorsers for a transaction in the form of a set of peer nodes that are necessary for endorsement. When a client sends the transaction to the peers specified in the endorsement policy, the transaction is executed to validate the transaction. After validation, the transactions enter an ordering phase in which a consensus protocol is used to produce an ordered sequence of endorsed transactions grouped into blocks.

This application can utilize nodes that are the communication entities of the blockchain system. A "node" may perform a logical function in the sense that multiple nodes of different types can run on the same physical server. Nodes are grouped in trust domains and are associated with logical entities that control them in various ways. Nodes may include different types, such as a client or submitting-client node which submits a transaction-invocation to an endorser (e.g., peer), and broadcasts transaction-proposals to an ordering service (e.g., ordering node). Another type of node is a peer node which can receive client submitted transactions, commit the transactions and maintain a state and a copy of the ledger of blockchain transactions. Peers can also have the role of an endorser, although it is not a requirement. An ordering-service-node or orderer is a node running the communication service for all nodes, and which implements a delivery guarantee, such as a broadcast to each of the peer nodes in the system when committing transactions and modifying a world state of the blockchain, which is another name for the initial blockchain transaction which normally includes control and setup information.

This application can utilize a ledger that is a sequenced, tamper-resistant record of all state transitions of a blockchain. State transitions may result from chaincode invocations (i.e., transactions) submitted by participating parties (e.g., client nodes, ordering nodes, endorser nodes, peer nodes, etc.). Each participating party (such as a peer node) can maintain a copy of the ledger. A transaction may result in a set of asset key-value pairs being committed to the ledger as one or more operands, such as creates, updates, deletes, and the like. The ledger includes a blockchain (also referred to as a chain) which is used to store an immutable, sequenced record in blocks. The ledger also includes a state database which maintains a current state of the blockchain.

This application can utilize a chain that is a transaction log which is structured as hash-linked blocks, and each block contains a sequence of N transactions where N is equal to or greater than one. The block header includes a hash of the block's transactions, as well as a hash of the prior block's header. In this way, all transactions on the ledger may be sequenced and cryptographically linked together. Accordingly, it is not possible to tamper with the ledger data without breaking the hash links. A hash of a most recently added blockchain block represents every transaction on the chain that has come before it, making it possible to ensure that all peer nodes are in a consistent and trusted state. The chain may be stored on a peer node file system (i.e., local, attached storage, cloud, etc.), efficiently supporting the append-only nature of the blockchain workload.

The current state of the immutable ledger represents the latest values for all keys that are included in the chain transaction log. Since the current state represents the latest key values known to a channel, it is sometimes referred to as a world state. Chaincode invocations execute transactions against the current state data of the ledger. To make these chaincode interactions efficient, the latest values of the keys may be stored in a state database. The state database may be simply an indexed view into the chain's transaction log, it can therefore be regenerated from the chain at any time. The state database may automatically be recovered (or generated if needed) upon peer node startup, and before transactions are accepted.

The global trade ecosystem is a huge contributor to the global economy. For example, ocean shipping is one of the most critical means of cargo trade. Since the containerization revolution in the 1960s, the trading ecosystem has grown to an amazing scale, but like most things that are extensive in size, the trading ecosystem has developed inefficiencies and complexities. These inefficiencies come from trying to create point-to-point connections between all the different parties involved, data that can be trapped in silos, contrasting views on transactions, and processes that are subject to fraud and wasted time. All the while, being underpinned by the burden of paper-based processes that stifle innovation and speed.

There are two predominant types of data related to managing the global trade including shipping milestones (referred to herein as events) and trade documentation. Milestones can include various steps of the journey of a container, for example, the anticipated arrival date that's determined before the container even moves, the time when the container is sealed at a point of origin, an air temperature that the container is exposed to at various points of the journey, and the like. These examples are just a few of the many milestones that are so critical to the supply chain ecosystem to plan for and execute a shipment. Just as critical are the documents that officially define and authorize a shipment. Documents include packing lists and bill of lading documents as well as a variety of documents that vary by region and trade route. This documentation plays a central role to the supply chain.

Ocean shipping (as well as other forms of transport) are highly competitive and highly regulated. It is imperative that carriers trust that participation in a platform will not expose them to competitive or regulatory risks. For example, ocean carriers may originate key documents (e.g., bill of lading, sea waybill, etc.) that others consume. In the same way, other participants on the network need to produce documents and have assurance that only correct parties will receive access thereto. Examples of private Information include (but may are not limited to) shipment participants, documents, detailed location data (addresses), and the like. What is needed is a way to share data with all participants on the ecosystem while maintaining confidential or private information secure and only accessible or changeable by the correct parties.

The example embodiments provide a system which can dynamically assign permissions to participants (e.g., organizations, etc.) involved in a multi-party transportation process. The system may store predefined roles which are mapped to different participant types. When a participant is identified as being part of the process, the system may determine a role for the participant for that particular process, and dynamically assign read and write permissions to documents and event data of the process based on the determined role. The role that is assigned to a participant may differ based on the participant's position in the process. Therefore, the system can dynamically determine, at runtime, a role for the participant based on the particular details of the process, and assign read/write permissions accordingly. Furthermore, the system can store such permissions to blockchain such that it is stored securely/immutably, and is accessible across different locations/points in the network. As new data becomes available, the permissions on the blockchain can be updated to reflect the changed data, and the permissions may be updated/assigned accordingly. When a participant (or a user thereof) attempts to access the data, the blockchain may enforce access permissions thereby preventing unauthorized access to the data, while also enabling disparate parties a convenient mechanism for viewing the data.

The system described herein supports global trade permissions and controlled access to data, resources and documents in a dynamic and automated way without requiring definitions of access on a point-to-point manner for participants involved in the process. The example embodiments combine the concepts of roles which each party can take on a given shipment with document types and event types that each role can produce/access. Furthermore, the system can derive access control that needs to be enforced at runtime for each user accessing each document or piece of data. For example, to determine access rights that a given participant has on trade information (including milestones and documents), the system may determine the access control from the information about the role of the participant on the given shipment. During the runtime, various policy services enforce the permissions such that only the data that is allowed can be seen by each party. In some embodiments, the system may enable a transport service to override the permissions for a given shipment, allow the uploader of a document to adjust the permissions based on their preferences, support access control for each level of the shipment hierarchy, and the like.

Some of the benefits of the system described herein including providing multiple parties access to the data without having the create one-to-one connection with each of the parties they are involved with. As such, parties encounter many advantages, including end-to-end visibility across shipping corridors and real time access to information, results in enriched port collaboration and improved terminal planning. The system also provides a digital audit trail of shipment events and documents which reduces customer services and network integration costs and less mis-declared cargo. The system also provides for shared and digitized import/export information which creates more informed risk assessments, less paperwork and easier connection to national platforms. The system also provides real-time access to supply chain events for shipment and provides inland transport with improved planning and utilization of assets, diluting bottlenecks. In addition, with the entire supply chain streamlined, predictability is significantly improved allowing for earlier notification of issues and less inventory. The system also provides effectiveness of track-and-trace tools which allow for clearance brokerage tools to be improved. Furthermore, the use of blockchain provides an immutable source of information for trade finance thereby providing financial services access to real time data.

As further described herein, participants can be dynamically given access to blockchain data such as event data (milestones) and documents which are associated with a multi-party transport process. As described herein, the term "transport" should be understood to refer to any method of transporting cargo or goods including ocean/ships, rails/trains, roads/trucks, flight/aircraft, and the like.

Examples of participant types include, but are not limited to cargo owner, agent, ocean carrier, transport intermediary, inland transporter, terminal operator, customs authority, financial services, and the like.

Examples of roles that can be granted to participant types include, but are not limited to, buyer, seller, exporter, importer, consignor, consignee, transport service buyer, transport service provider, origin or destination third party logistics (3PL), customs broker (export, import, etc.), marine terminal (origin, destination, etc.), rail operator, truck operator, barge operator, feeder, trans-shipment terminal, port community service (PCS), export authority, import authority, bank (seller's bank, buyer's bank, etc.), insurance provider, and the like.

Each participant type may be mapped to a plurality of different roles. For example, a cargo owner may have a role of seller, buyer, exporter, importer, consignor, consignee, transport service buyer, etc., based on the activities of the cargo owner in the multi-party transport process. When the policy service further described herein receives the details of a multi-party transport process, the policy service may assign each participant a role or a plurality of roles based on the mappings and based on the actions of the participant in the transport process. For example, if the cargo owner is both the original owner who is selling the cargo, and a shipper of the cargo from one country to the next, the cargo owner may take the role of both seller, exporter, and consignor.

Examples of documents that may be part of the multi-party transport process include, but are not limited to, booking confirmation, invoice, shipping instructions, bill of lading, sea waybill, house bill of lading, forwarder's cargo receipt, arrival notice, dangerous goods declaration, booking request, and the like.

Examples of events that may occur during the multi-party transport process include, but are not limited to, an administrator event, an origin planned event, an ocean planned event, a destination planned event, an origin estimated event, an ocean estimated event, a destination estimated event, an origin actual event, an ocean actual event, a destination actual event, and the like.

By dynamically combining the mapping of a participant to a role within the multi-party transport hierarchy with the assertion of permissions to the party roles for different milestone events of the shipment and for different trade documents, the system may derive and enforce permissions to access (read/write) certain data of the multi-party transport process. As a non-limiting example, the system may determine that an ocean carrier can upload a bill of lading document of a shipment, but an inland transporter (e.g., trucker) cannot have access to this document. The overall system is composed of services which derive the permission information and then enforce it as part of accessing the objects from the system, including milestone events and documents.

FIG. 1 illustrates a trade ecosystem 100 for managing the transport of cargo according to example embodiments. Referring to FIG. 1, a host platform 130 may host the system described herein, and may include an application programming interface (API) 132, one or more services 134, and a blockchain 136. Participants 110 of the system may access the services 134 via one or more applications 120 or APIs 132 to upload initial transportation data (e.g., parties involved, route information, cargo information, etc.) of a multi-party transport process. Based on this information, the services 134 may identify roles of each of the parties involved and dynamically assign access rights (e.g., to read and/or write data) to the documents and the event data of the multi-party transport process. The dynamically assigned access information as well as an identifier of the multi-party transport process, the events, and documents, and the parties, may be stored on the blockchain 136.

Meanwhile, the API 132 may enable data communications between the participants 110 in the multi-party transport process and the host platform 130, the applications 120 and the host platform 130, and the like. Cargo-related data may also be uploaded from the participants 110, and integrated into a format that is suitable for the platform 130 via an integration framework 112. For example, imaging data may be captured of cargo (e.g., scanning a product ID or container ID) which is then submitted to the blockchain 136 along with contextual information in the form of a textual description such as geo-location of the cargo, a current participant in possession of the cargo, an identifier of a transport (barge, truck, rail, etc.) which has possession of the cargo, sensor data (e.g., temperature, speed, humidity, etc.) of an environment in which the cargo is located, and the like. The data may be stored on the blockchain 136 in an immutable manner such that parties can later review the data if something goes wrong. This can provide a quick understanding of why the cargo/shipment failed to meet expectations, etc.

Initially, the participants 110 may be onboarded as organizations on the solution. Each participant may be assigned a participant type, which defines a set of specific roles the organization can take on a shipment. For example, a participant type of cargo owner can have the roles of seller, buyer, importer, exporter, consignor, consignee, transport service buyer, etc. The services 134 may assign roles, define read/write permissions for each role/party in the multi-party transport process, and control access to data of the multi-party transport process based on the defined read and write permissions. For example, a party may be allowed to read data of a certain document or a milestone event, but may not be allowed to write data. As another example, a party may be allowed to see some documents, but not all documents involved in the multi-party transport process. The services 134 may dynamically assign permissions and subsequently control access to the data based on the dynamically assigned permissions. The data of the multi-party transport process may be stored on the blockchain 136, an off-chain system, and the like.

For example, events/milestones of cargo as it moves through the multi-party transport process may be stored in association with the blockchain 136. The event data may be uploaded from the participants 110 via the integration framework 112. The event data may be stored on the blockchain 136. As another example, the event data may be stored off-chain with a hash of the event data (for purposes of verification) being stored on the blockchain 136. Examples of events include container status events, which refer to a PID (Physical ID) of the container, and where they are located at a given time. For example, an image of the PID may be captured and uploaded with contextual information to the host platform 130. The services 134 may create a hash of the event data and store it on the blockchain 136 while the event data is stored off-chain. When a user (e.g., of a participant of the multi-party transport process) subsequently attempts to access the event data, the access may be controlled through a policy service (which includes smart contracts) and which is further described with respect to FIGS. 4A-4D. Access to the event data may be based on the roles that are dynamically assigned to a participant during runtime.

Likewise, documents associated with the multi-party transport process may be stored on the blockchain 136 or they may be stored off-chain with a hash of the document being stored on the blockchain 136. Similar to the event data, access to the document data may be controlled by the policy service, and access to the documents may be based on the roles that are dynamically assigned to the participant during runtime.

Each of the interactions with the host platform 130 may be authenticated, and users and organizations (participants) may be mapped to digital identities registered on the blockchain through a CA (Certificate Authority). Furthermore, the use of the blockchain 136 brings a lot of advantages to the solution. For example, the blockchain 136 provides an immutable, shared, replicated ledger which can solve issues that can occur when multiple untrusting parties transact together such as lack of trust, and the like. Blockchain 136 also provides a single version of the truth. This can be helpful because disputes are common, and resolution is costly. Furthermore, the blockchain 136 can be used to prove authenticity and ownership. The blockchain 136 can be used to track and control access to multiple steps of paperwork (global trade documentation, supply chain finance, etc.). The blockchain 136 also provides reliable visibility of events across multiple parties including recalls, chain of custody tracking, provenance, and the like. The blockchain 136 may also provide auditability through the immutable ledger and prevent fraud/tampering due to the distributed nature of the blockchain 136.

Figure 2A:
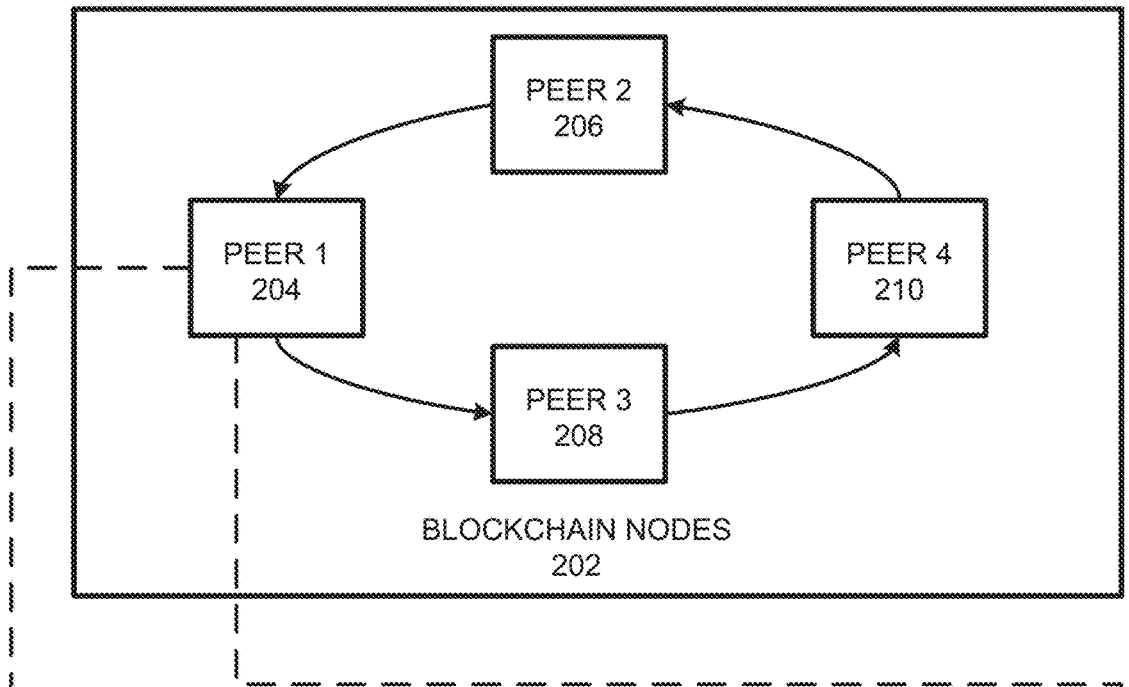
FIG. 2A is a diagram that illustrates a blockchain architecture configuration, according to example embodiments.
Figure 2A:
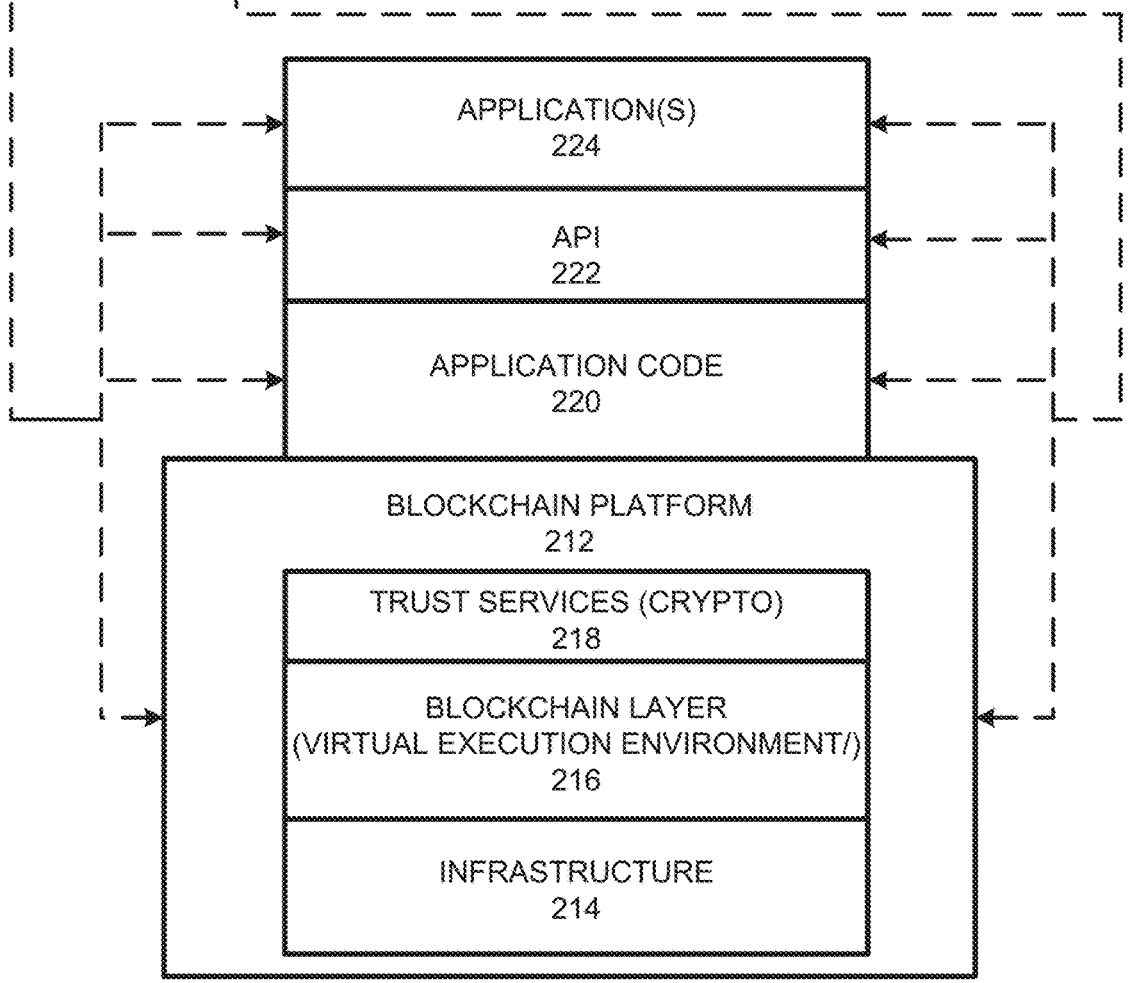

FIG. 2A illustrates a blockchain architecture configuration 200, according to example embodiments. Referring to FIG. 2A, the blockchain architecture 200 may include certain blockchain elements, for example, a group of blockchain nodes 202. The blockchain nodes 202 may include one or more nodes 204-210 (these four nodes are depicted by example only). These nodes participate in a number of activities, such as blockchain transaction addition and validation process (consensus). One or more of the blockchain nodes 204-210 may endorse transactions based on endorsement policy and may provide an ordering service for all blockchain nodes in the architecture 200. Each of the blockchain nodes 204-210 may have installed therein a blockchain platform 212, application code 220 (e.g., smart contracts, etc.), application programming interfaces (APIs) 222, applications 224, and the like. For example, a blockchain node may initiate a blockchain transaction and seek to write to a blockchain immutable ledger stored in blockchain layer 216, a copy of which may also be stored on the underpinning physical infrastructure 214, of the blockchain platform 212. The blockchain configuration may include applications 224 which are linked to the APIS 222 to access and execute stored program/application code 220 (e.g., blockchain clients, chaincode, smart contracts, etc.) which can be created according to a customized configuration sought by participants and can maintain their state, receive external information and communicate with the blockchain APIs. This can be deployed and installed, on all blockchain nodes 204-210.

The blockchain base or platform 212 may include various layers of blockchain data, services (e.g., cryptographic trust services, virtual execution environment, etc.), and underpinning physical computer infrastructure that may be used to receive and store new transactions and provide access to auditors which are seeking to access data entries. The blockchain layer 216 may expose an interface that provides access to the virtual execution environment necessary to process the program code and engage the physical infrastructure 214. Cryptographic trust services 218 may be used to verify transactions such as asset exchange transactions and keep information private.

The blockchain architecture configuration of FIG. 2A may process and execute program/application code 220 via one or more interfaces exposed, and services provided, by blockchain platform 212. The code 220 may control blockchain assets. For example, the code 220 can store and transfer data, and may be executed by nodes 204-210 in the form of a smart contract and associated chaincode with conditions or other code elements subject to its execution. As a non-limiting example, smart contracts may be created to execute reminders, updates, and/or other notifications subject to the changes, updates, etc. The smart contracts can themselves be used to identify rules associated with authorization and access requirements and usage of the ledger. For example, read data may be processed by smart contracts in the application code 220 to determine the proper access and return only the visible results for the requesting party. Also, Write data may be processed by smarts contracts in the application code 220 to determine whether the right access to the specific asset is allowed to this party/organization.

A smart contract may be created in a programming language, and then associate/instantiated/deployed on a channel for all the blockchain nodes. The smart contract may include executable code which is registered, stored, and/or replicated with a blockchain channel or ledger (e.g., distributed network of blockchain peers). A transaction is submitted by the application or blockchain client, which may cause the execution of the smart contract code for validation or consensus purposes. The successful execution of the smart contract may trigger a trusted modification(s) to a state of a digital blockchain ledger. The modification(s) to the blockchain ledger caused by the smart contract execution may be automatically replicated throughout the distributed network of blockchain peers through intra blockchain communication protocols.

The smart contract may write data to the blockchain in the format of key-value pairs. Furthermore, the smart contract code can read the values stored in a blockchain and use them in application operations. The smart contract code can write the output of various logic operations into the blockchain. Data written to the blockchain can be public and/or can be encrypted and maintained as private. The temporary data that is used/generated by the smart contract is held in memory by the supplied execution environment, then deleted once the data needed for the blockchain is identified.

A chaincode may include the code interpretation of a smart contract, with additional features. As described herein, the chaincode may be program code deployed on the blockchain nodes network, where it is executed and validated by chain validators together during a consensus process.

Figure 2B:
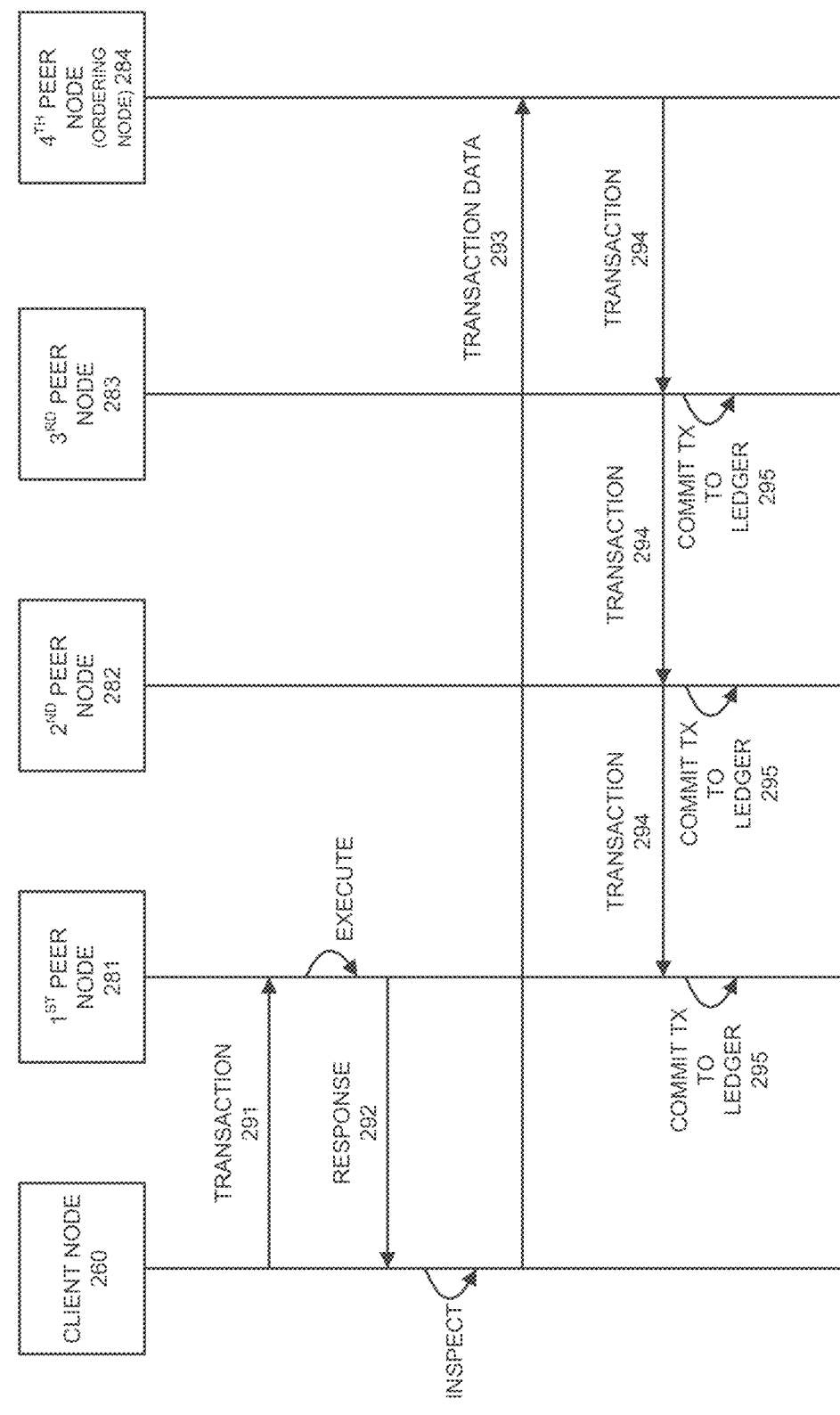
FIG. 2B is a diagram that illustrates a blockchain transactional flow, according to example embodiments.

FIG. 2B illustrates an example of a blockchain transactional flow 250 between nodes of the blockchain in accordance with an example embodiment. Referring to FIG. 2B, the transaction flow may include a transaction proposal 291 sent by an application client node 260 to an endorsing peer node 281. The endorsing peer 281 may verify the client signature and execute a chaincode function to initiate the transaction. The execution of the chaincode in 281 may include a permissions check for the proper read and/or write permission for the party/organization which invoked the transaction. For example, whether a party is authorized to view a document or event data may be checked. The output may include the chaincode results, a set of key/value versions that were read in the chaincode (read set), and the set of keys/values that were written in chaincode (write set). The proposal response 292 is sent back to the client 260 along with an endorsement signature, if approved. The client 260 assembles the endorsements into a transaction payload 293 and broadcasts it to an ordering service node 284. The ordering service node 284 then delivers ordered transactions as blocks to all peers 281-283 on a channel. Before committal to the blockchain, each peer 281-283 may validate the transaction. For example, the peers may check the endorsement policy to ensure that the correct allotment of the specified peers have signed the results and authenticated the signatures against the transaction payload 293.

Referring again to FIG. 2B, the client node 260 initiates the transaction 291 by constructing and sending a request to the peer node 281, which is an endorser. The client 260 may include an application leveraging a supported software development kit (SDK), which utilizes an available API to generate a transaction proposal. The proposal is a request to invoke a chaincode function so that data can be read and/or written to the ledger (i.e., write new key value pairs for the assets). The SDK may serve as a shim to package the transaction proposal into a properly architected format (e.g., protocol buffer over a remote procedure call (RPC)) and take the client's cryptographic credentials to produce a unique signature for the transaction proposal.

In response, the endorsing peer node 281 may verify (a) that the transaction proposal is well formed, (b) the transaction has not been submitted already in the past (replay-attack protection), (c) the signature is valid, and (d) that the submitter (client 260, in the example) is properly authorized to perform the proposed operation on that channel. The endorsing peer node 281 may take the transaction proposal inputs as arguments to the invoked chaincode function. The chaincode is then executed against a current state database to produce transaction results including a response value, read set, and write set. However, no updates are made to the ledger at this point. In 292, the set of values, along with the endorsing peer node's 281 signature is passed back as a proposal response 292 to the SDK of the client 260 which parses the payload for the application to consume.

In response, the application of the client 260 inspects/verifies the endorsing peers signatures and compares the proposal responses to determine if the proposal response is the same. If the chaincode only queried the ledger, the application would inspect the query response and would typically not submit the transaction to the ordering node service 284. If the client application intends to submit the transaction to the ordering node service 284 to update the ledger, the application determines if the specified endorsement policy has been fulfilled before submitting (i.e., did all peer nodes necessary for the transaction endorse the transaction). Here, the client may include only one of multiple parties to the transaction. In this case, each client may have their own endorsing node, and each endorsing node will need to endorse the transaction. The architecture is such that even if an application selects not to inspect responses or otherwise forwards an unendorsed transaction, the endorsement policy will still be enforced by peers and upheld at the commit validation phase.

After successful inspection, in step 293 the client 260 assembles endorsements into a transaction and broadcasts the transaction proposal and response within a transaction message to the ordering node 284. The transaction may contain the read/write sets, the endorsing peers signatures and a channel ID. The ordering node 284 does not need to inspect the entire content of a transaction in order to perform its operation, instead the ordering node 284 may simply receive transactions from all channels in the network, order them chronologically by channel, and create blocks of transactions per channel.

The blocks of the transaction are delivered from the ordering node 284 to all peer nodes 281-283 on the channel. The transactions 294 within the block are validated to ensure any endorsement policy is fulfilled and to ensure that there have been no changes to ledger state for read set variables since the read set was generated by the transaction execution. Transactions in the block are tagged as being valid or invalid. Furthermore, in step 295 each peer node 281-283 appends the block to the channel's chain, and for each valid transaction the write sets are committed to current state database. An event is emitted, to notify the client application that the transaction (invocation) has been immutably appended to the chain, as well as to notify whether the transaction was validated or invalidated.

Figure 3A:
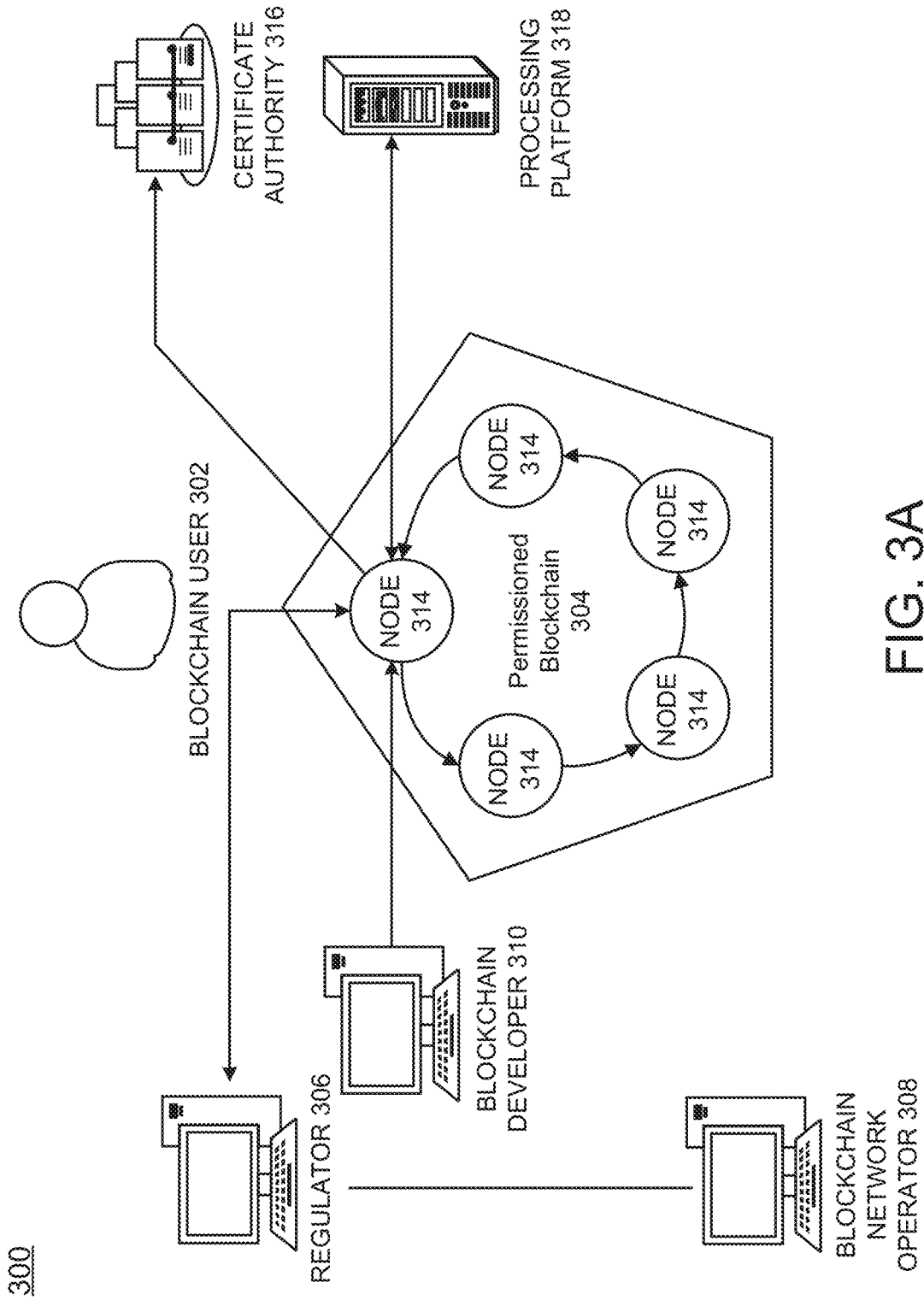
FIG. 3A is a diagram that illustrates a permissioned blockchain network, according to example embodiments.

FIG. 3A illustrates an example of a permissioned blockchain network 300, which features a distributed, decentralized peer-to-peer architecture. In this example, a blockchain user 302 may initiate a transaction to the permissioned blockchain 304. In this example, the transaction can be a deploy, invoke, or query, and may be issued through a client-side application leveraging an SDK, directly through an API, etc. Networks may provide access to a regulator 306, such as an auditor. A blockchain network operator 308 manages member permissions, such as enrolling the regulator 306 as an "auditor" and the blockchain user 302 as a "client". An auditor could be restricted only to querying the ledger whereas a client could be authorized to deploy, invoke, and query certain types of chaincode.

A blockchain developer 310 can write chaincode and client-side applications. The blockchain developer 310 can deploy chaincode directly to the network through an interface. In this example, the blockchain user 302 connects to the permissioned blockchain 304 through a peer node 314. Before proceeding with any transactions, the peer node 314 retrieves the user's enrollment and transaction certificates from a certificate authority 316, which manages user roles and permissions. Blockchain users must possess these digital certificates in order to transact on the permissioned blockchain 304. Meanwhile, a user attempting to utilize chaincode may be required to verify their credentials.

Figure 3B:
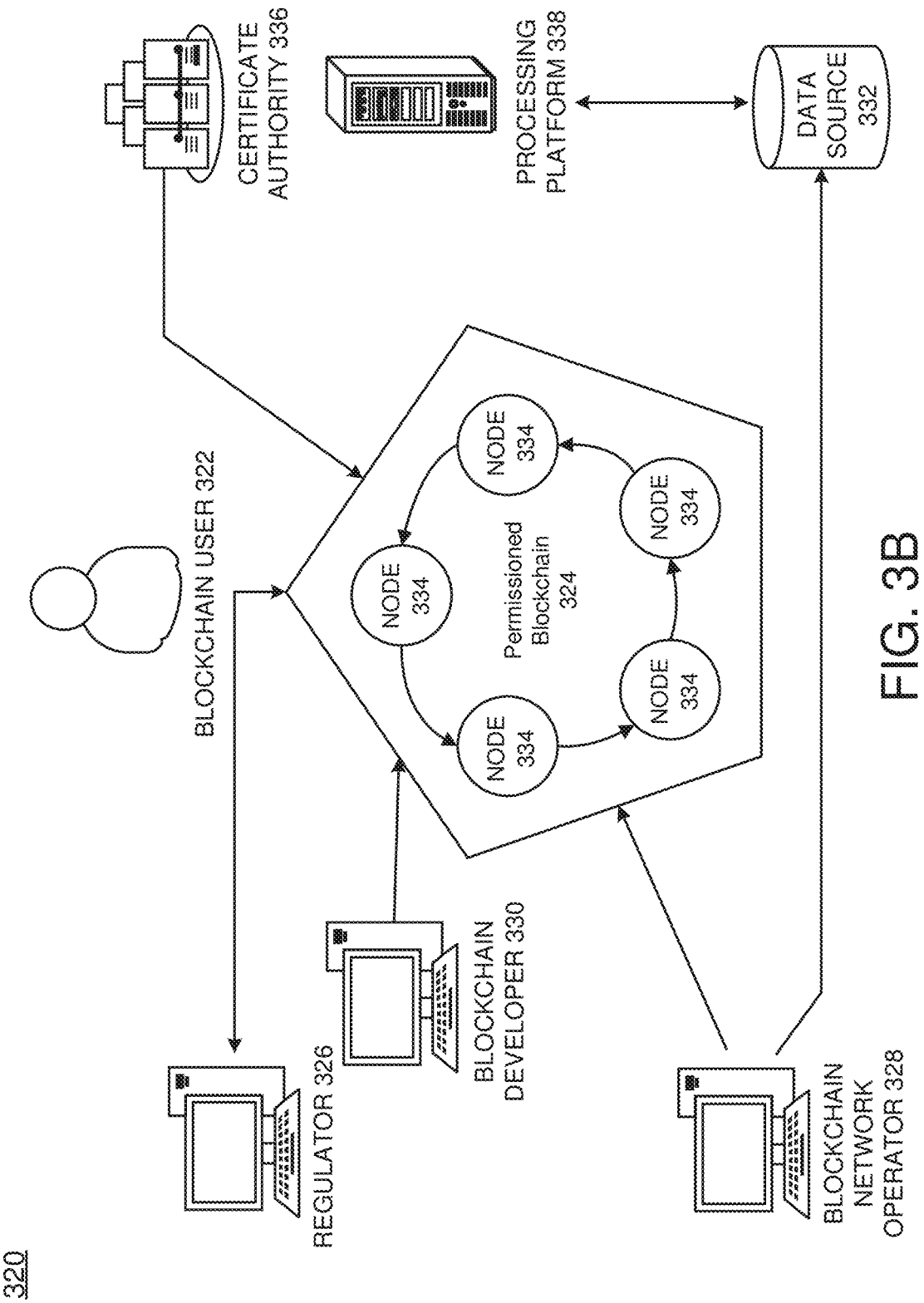
FIG. 3B is a diagram that illustrates another permissioned blockchain network, according to example embodiments.

FIG. 3B illustrates another example of a permissioned blockchain network 320, which features a distributed, decentralized peer-to-peer architecture. In this example, a blockchain user 322 may submit a transaction to the permissioned blockchain 324. In this example, the transaction can be a deploy, invoke, or query, and may be issued through a client-side application leveraging an SDK, directly through an API, etc. Networks may provide access to a regulator 326, such as an auditor. A blockchain network operator 328 manages member permissions, such as enrolling the regulator 326 as an "auditor" and the blockchain user 322 as a "client". An auditor could be restricted only to querying the ledger whereas a client could be authorized to deploy, invoke, and query certain types of chaincode.

A blockchain developer 330 writes chaincode and client-side applications. The blockchain developer 330 can deploy chaincode directly to the network through an interface. To include credentials from a traditional data source 332 in chaincode, the developer 330 could use an out-of-band connection to access the data. In this example, the blockchain user 322 connects to the network through a peer node 334. Before proceeding with any transactions, the peer node 334 retrieves the user's enrollment and transaction certificates from the certificate authority 336. In some cases, blockchain users must possess these digital certificates in order to transact on the permissioned blockchain 324. Meanwhile, a user attempting to utilize chaincode may be required to verify their credentials on the traditional data source 332. To confirm the user's authorization, chaincode can use an out-of-band connection to this data through a traditional processing platform 338.

In some embodiments, the blockchain herein may be a permissionless blockchain. In contrast with permissioned blockchains which require permission to join, anyone can join a permissionless blockchain. For example, to join a permissionless blockchain a user may create a personal address and begin interacting with the network, by submitting transactions, and hence adding entries to the ledger. Additionally, all parties have the choice of running a node on the system and employing the mining protocols to help verify transactions.

Figure 3C:
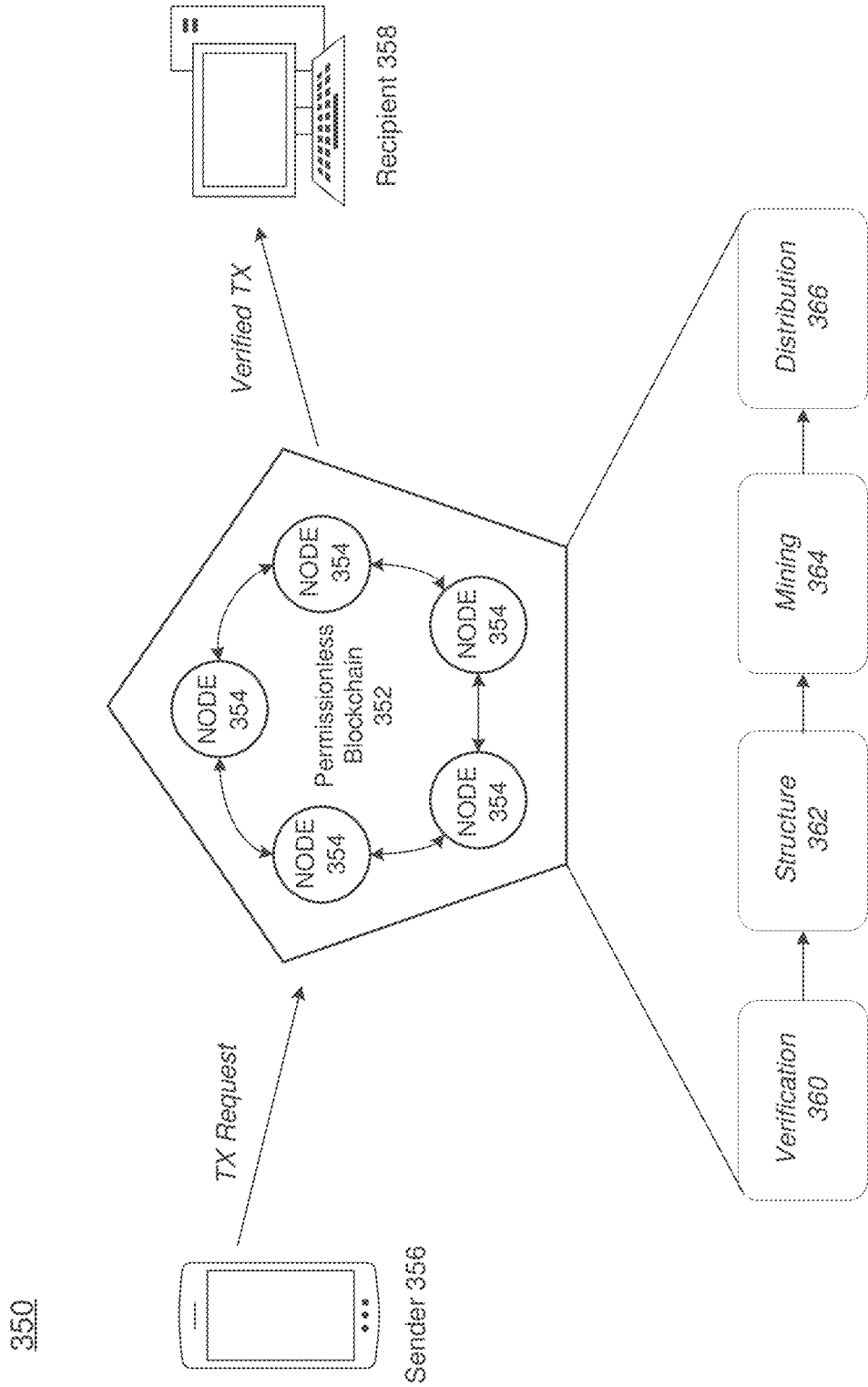
FIG. 3C is a diagram that illustrates a permissionless blockchain network, according to example embodiments.

FIG. 3C illustrates a process 350 of a transaction being processed by a permissionless blockchain 352 including a plurality of nodes 354. A sender 356 desires to send payment or some other form of value (e.g., a deed, medical records, a contract, a good, a service, or any other asset that can be encapsulated in a digital record) to a recipient 358 via the permissionless blockchain 352. In one embodiment, each of the sender device 356 and the recipient device 358 may have digital wallets (associated with the blockchain 352) that provide user interface controls and a display of transaction parameters. In response, the transaction is broadcast throughout the blockchain 352 to the nodes 354. Depending on the blockchain's 352 network parameters the nodes verify 360 the transaction based on rules (which may be pre-defined or dynamically allocated) established by the permissionless blockchain 352 creators. For example, this may include verifying identities of the parties involved, etc. The transaction may be verified immediately or it may be placed in a queue with other transactions and the nodes 354 determine if the transactions are valid based on a set of network rules.

In structure 362, valid transactions are formed into a block and sealed with a lock (hash). This process may be performed by mining nodes among the nodes 354. Mining nodes may utilize additional software specifically for mining and creating blocks for the permissionless blockchain 352. Each block may be identified by a hash (e.g., 256 bit number, etc.) created using an algorithm agreed upon by the network. Each block may include a header, a pointer or reference to a hash of a previous block's header in the chain, and a group of valid transactions. The reference to the previous block's hash is associated with the creation of the secure independent chain of blocks.

Before blocks can be added to the blockchain, the blocks must be validated. Validation for the permissionless blockchain 352 may include a proof-of-work (PoW) which is a solution to a puzzle derived from the block's header. Although not shown in the example of FIG. 3C, another process for validating a block is proof-of-stake. Unlike the proof-of-work, where the algorithm rewards miners who solve mathematical problems, with the proof of stake, a creator of a new block is chosen in a deterministic way, depending on its wealth, also defined as "stake." Then, a similar proof is performed by the selected/chosen node.

With mining 364, nodes try to solve the block by making incremental changes to one variable until the solution satisfies a network-wide target. This creates the PoW thereby ensuring correct answers. In other words, a potential solution must prove that computing resources were drained in solving the problem. In some types of permissionless blockchains, miners may be rewarded with value (e.g., coins, etc.) for correctly mining a block.

Here, the PoW process, alongside the chaining of blocks, makes modifications of the blockchain extremely difficult, as an attacker must modify all subsequent blocks in order for the modifications of one block to be accepted. Furthermore, as new blocks are mined, the difficulty of modifying a block increases, and the number of subsequent blocks increases. With distribution 366, the successfully validated block is distributed through the permissionless blockchain 352 and all nodes 354 add the block to a majority chain which is the permissionless blockchain's 352 auditable ledger. Furthermore, the value in the transaction submitted by the sender 356 is deposited or otherwise transferred to the digital wallet of the recipient device 358.

Figure 4A:
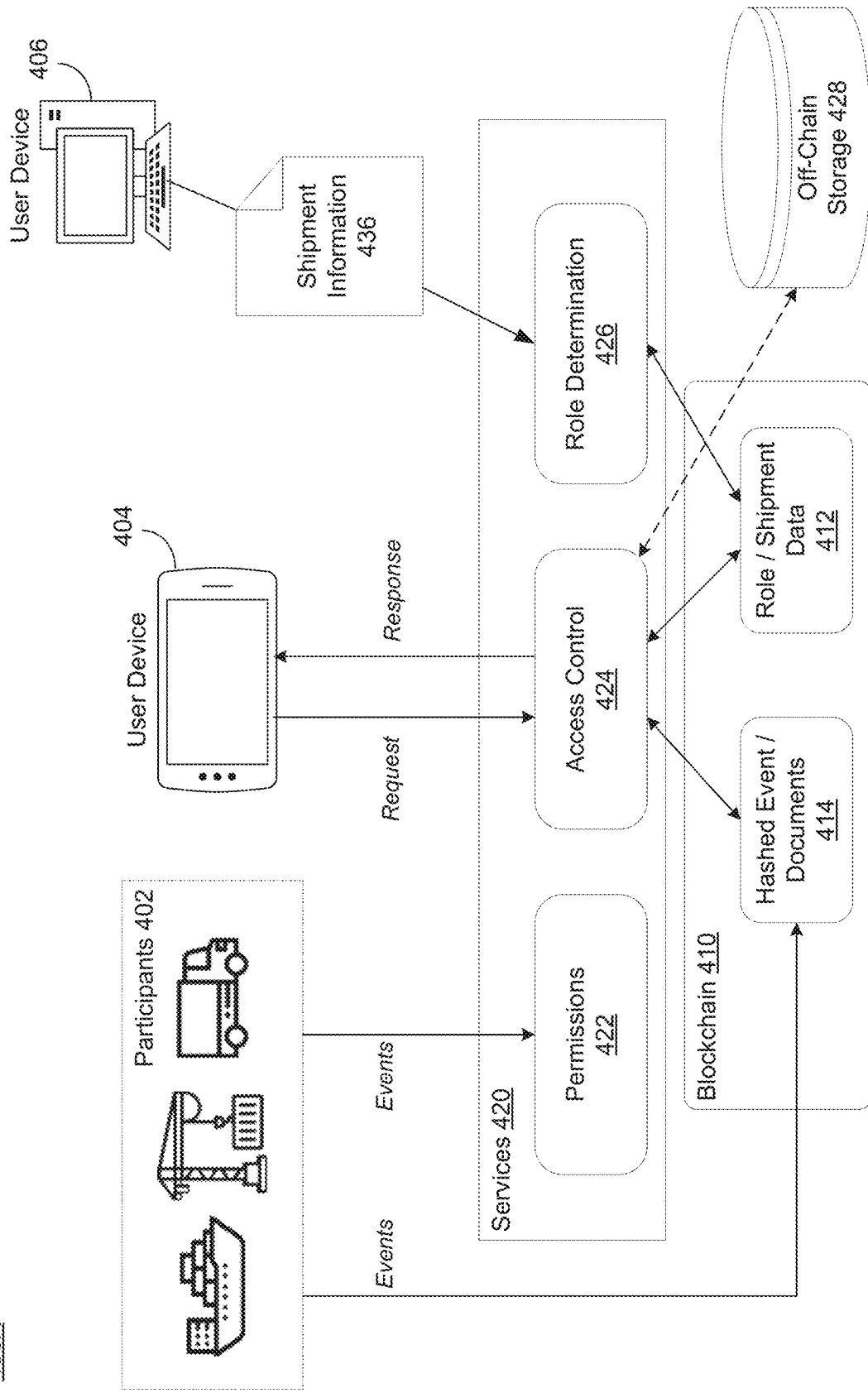
FIG. 4A is a diagram that illustrates services of a host platform for assigning permissions and controlling access according to example embodiments.

FIG. 4A illustrates services 420 of a host platform for assigning permissions and controlling access according to example embodiments. In this example, the services 420 include a permissions service 422, an access control service 424, and a role determination service 426. Here, the access control service 424 and the role determination service 426 may be referred to as policy services. The permission service 422 may be seeded with templates for deriving the permissions that a participant role can have. For instance, a consignor role on a shipment can write (upload) a commercial invoice document but cannot read an import declaration document. These permissions can be accessed by the role determination service 426 and the access control service 424.

When a new shipment is created by a user device 406 (e.g., a user or a system associated with participants on a shipment, etc.), the user device 406 may provide shipment information 436 which includes data associated with a multi-party transport process including details specifying participants 402 (identifiers), a geographical origin, a destination, trans-shipment ports, a transport plan, milestone events, trade documents, etc. In response, the role determination service 426 may analyze the shipment information 436 received, build a transport summary and determine which participants 402 should be added to the multi-party transport process and with which role. An identifier of the shipment, an identifier of the participants/roles, access rights to documents and events, and the like, may be stored on the blockchain as role/shipment data 412. Here, the role and shipment data 412 may be stored as a transaction in a data block on the hash-linked chain of blocks of the blockchain.

For example, the role determination service 426 may receive the shipment information 436 identifying a multi-transport process and its details. In response, the role determination service 426 may identify terminals/ports which correspond to the geographical locations in the shipment information 436 at the locations identified as origin, destination, trans-shipment, etc. The terminals/ports may be added as terminals to the shipment, so they can be notified properly. As another example, countries of travel may be identified from the shipment information 436 and the role determination service 426 may determine customs authorities (participants) for the countries where the shipment travels through which may be added as origin/destination customs. As another example, a seller and a buyer may be identified from trade documents. The seller may be added as a consignor role while the buyer identified in trade documents may be added as a consignee role. Furthermore, the role determination service 426 may assign users of each of the identified participants/roles with access permissions to the system to read/write events or documents through different services (e.g., query services, subscription services, etc.).

As the container, cargo, palette, shipment, etc. moves through the chain of multi-party transport process, different events can be stored. For example, participants 402 may upload event data to the permissions service 422, or other services. The event data may be stored on the blockchain 410, or it may be hashed and stored as hashed data 414 on the blockchain and written to an off-chain storage 428 to conserve storage on the blockchain 410. Likewise, documents may be received from the participants 402 and stored on the blockchain 410, or, a hash of the documents may be stored on the blockchain 410 within the hashed data 414, and the document itself may be stored in the off-chain storage 428.

Meanwhile, when a user device 404 access the data/documents of the multi-party transport process, their access may be controlled by the access control service 424. Here the access control service 424 may control access to the data and the documents based on read/write permissions of a corresponding participant assigned by the role determination service 426. As a result, each participant (and it's users) on the system can only access the data they are allowed to access. In some embodiments, the logic for the role determining service 426 and the access control service 424 can be implemented using smart contracts.

By dynamically combining the organization to party roles at every level of the shipment hierarchy with the assertion of permissions to the party roles for different milestones of the shipment and for different trade documents, the system is able to derive and enforce permissions to access (read/write) with data in a given shipment. For example, the derived access may determine that an ocean carrier can upload a bill of lading document to a shipment, but an inland transportation service (Trucker) cannot have access to this document. The overall system is composed of services 422, 424, and 426 which derive the permission information and then enforce it as part of accessing the objects from the trade system, including milestone events and documents.

Figure 4B:
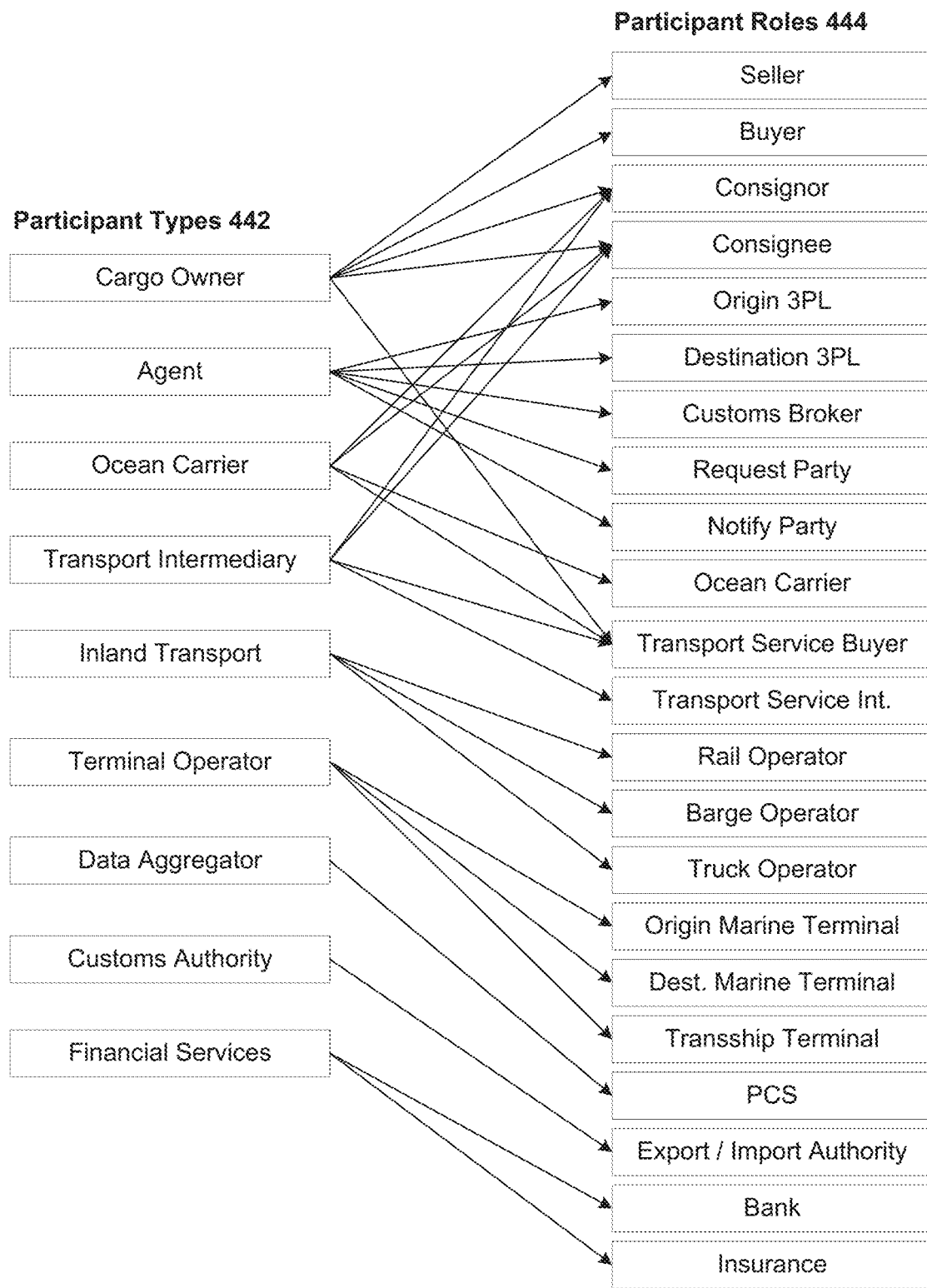
FIG. 4B is a diagram that illustrates a mapping between participant types and participant roles according to example embodiments.

FIG. 4B illustrates a mapping 440 between participant types 442 and participant roles 444 according to example embodiments. Referring to FIG. 4B, organizations that are involved in a multi-party transport process may be assigned to a particular participant type 442. The examples of the participant types 442 in FIG. 4B should not be considered exhaustive and other participant types are possible. Participant types may be assigned when an organization registers with the system. Furthermore, when a new transport object is received (identifying a new shipment/transport) the role determination service 426 may assign each participant identified in the transport object to one or more of the participant roles 444. As shown in FIG. 4B, participant types 442 may map to a plurality of different participant roles 444. Furthermore, some participant types 442 may map to the same participant roles 444. According to various embodiments, the role determination service 426 may determine which participant role 444 should be assigned to each participant based on data read by the role determination service 426 from trade documents of the multi-party transport process, shipment information provided by the customer, and the like.

FIG. 4C illustrates a table 450 storing access rights to documents 456 based on roles according to example embodiments. Referring to FIG. 4C, examples of access rights for two types of participants 452 (ocean carrier and inland transporter) are shown. As shown, each participant type 452 may include a plurality of different roles 454 where each of the roles may have individual access rights assigned thereto. As a result, the different roles 454 may have different access rights to the documents 456. Although not shown in FIG. 4C, access rights for all participant types and roles may be stored and managed by the permissions service 422, and may be accessed by the access control service 424.

Figure 4D:
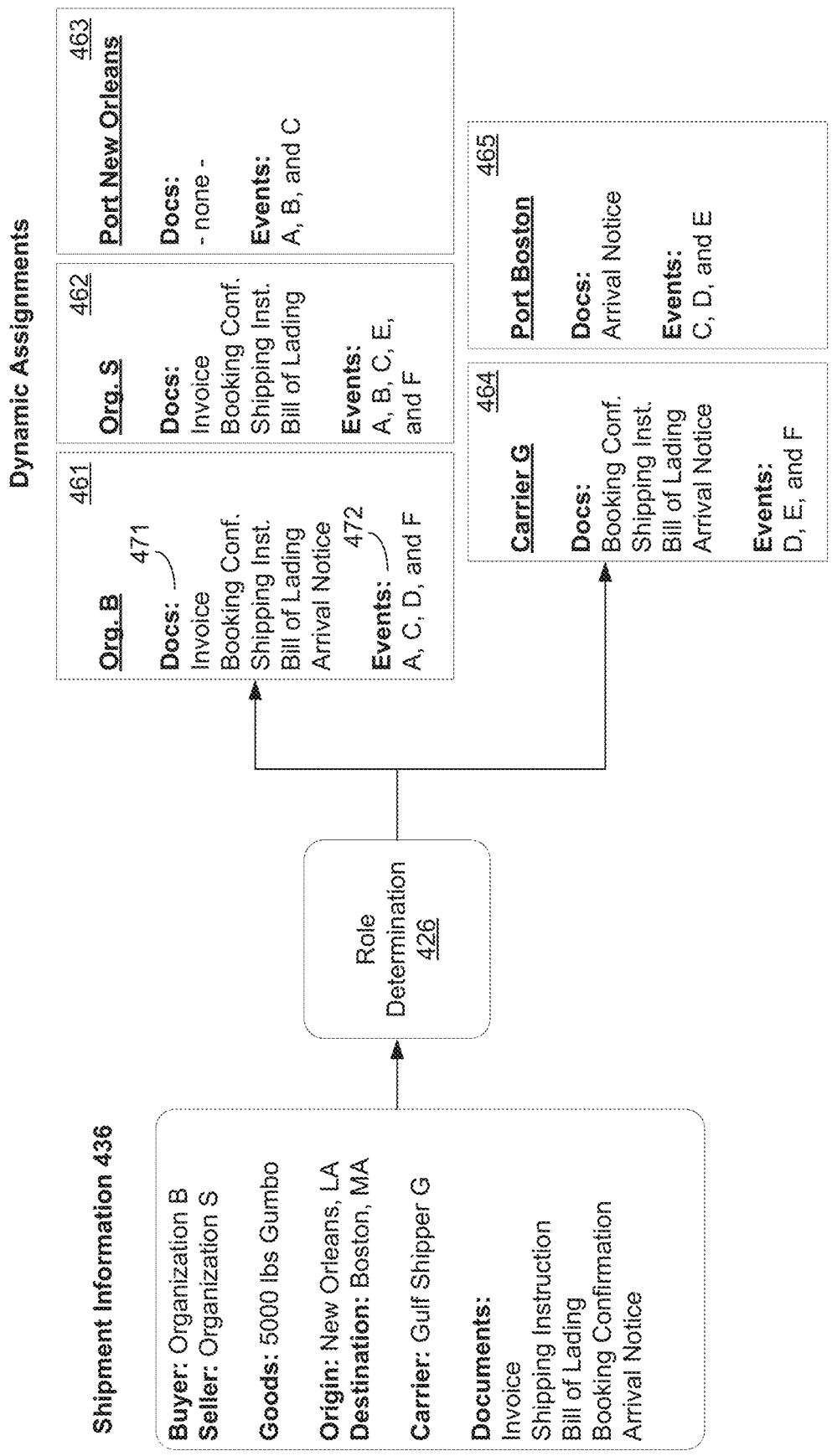
FIG. 4D is a diagram that illustrates a process of dynamically determining read and write permissions to documents and events according to example embodiments.

FIG. 4D illustrates a process 400D of dynamically determining read and write permissions to documents and events according to example embodiments. Referring to FIG. 4D, the role determination service 426 receives the shipment information 436 from one or more parties to the shipment. As another example, the shipment information 436 may be collated by the platform from events and documents received from multiple parties to the shipment. The role determination service 426 may inspect the documents, the received information, and the like, and identify a plurality of participants 461-465. Furthermore, the role determination service 426 may dynamically assign roles to each of the participants 461-465. Based on the dynamically assigned roles, the role determination service 426 may also identify documents 471 and events 472 that a participant has access to. The dynamic assignments of the participants 461-465 and their roles, permissions, etc., may be stored on the blockchain 410 as object data 412, and used by the access control service 424 to manage/control access to the data of the multi-party transport process.

Figure 5:
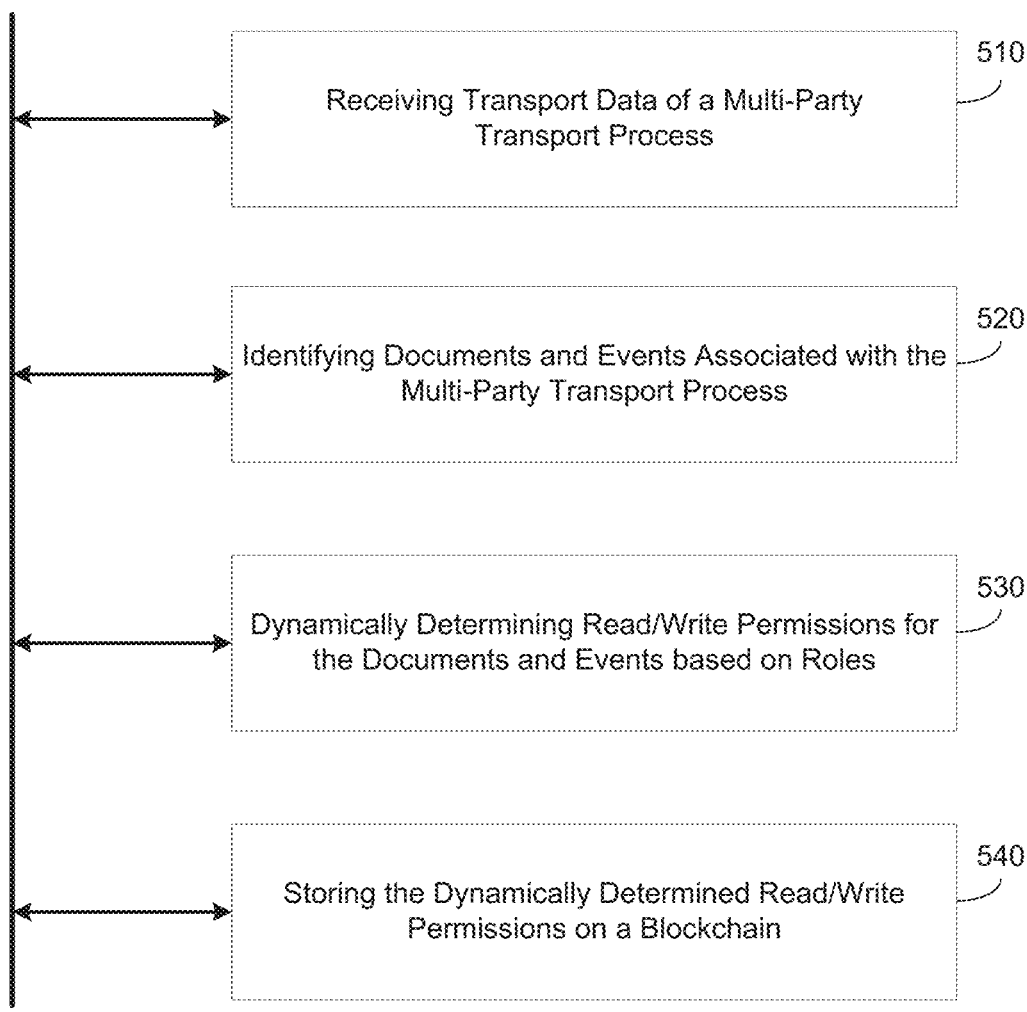
FIG. 5 is a diagram that illustrates a method of dynamically determining read and write permissions according to example embodiments.

FIG. 5 illustrates a method 500 of dynamically determining read and write permissions according to example embodiments. Referring to FIG. 5, in 510, the method may include receiving transport data of a multi-party transport process. For example, the transport data may identify an origin, a destination, shipping/transport entities, intermediate entities, ports, custom entities, buyers, sellers, and the like. As another example, the transport data may be extracted from documents that are received in 510 such as an invoice, a bill of lading, a sea waybill, and the like.

In 520, the method may include identifying documents and events that are associated with the multi-party transport process based on the received transport data. The documents may include any document that is associated with the parties of the multi-party transport process. The events (also referred to as milestones) may include container-based events that occur as a container moves from one location to the next.

In 530, the method may include dynamically determining read and write permissions for the documents and the events of the multi-party transport process based on predefined roles. For example, the dynamically determining may include deriving permissions to read and write data to the blockchain for a plurality of parties included in the multi-party transport process based on predefined roles that are mapped to the parties by chaincode of the blockchain. In some embodiments, the dynamically determining the read and write permissions may be further determined based on an origin, a destination, and one or more intermediate locations of the multi-party transport process. In 540, the method may further include storing an identifier of the multi-party transport process and the dynamically determined read and write permissions in a block on a blockchain.

In some embodiments, the method may include receiving a request to access one or more of a document and an event of the multi-party transport process, and granting the request based on the dynamically determined read and write permissions stored in the blockchain. In some embodiments, the method may further include receiving a request to access one or more of a document and an event of the multi-party transport process, and denying the request based on the dynamically determined read and write permissions stored in the blockchain. In some embodiments, the method may further include receiving an update of event data of the multi-party process, and storing the update of event data and read and write permissions for the update of event data in a block on the blockchain. In some embodiments, the update of event data may include a modification to a previously stored document. In some embodiments, the update of event data may include a modification to previously determined read and write permissions to an event and its data.

Figure 6A:
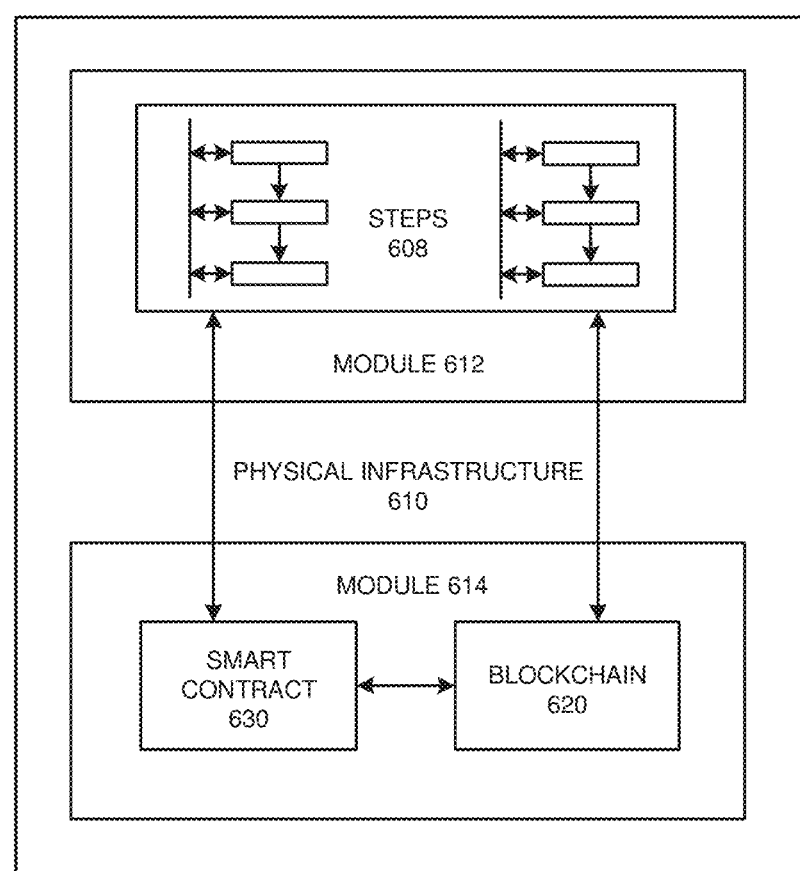
FIG. 6A is a diagram that illustrates an example system configured to perform one or more operations described herein, according to example embodiments.

FIG. 6A illustrates an example system 600 that includes a physical infrastructure 610 configured to perform various operations according to example embodiments. Referring to FIG. 6A, the physical infrastructure 610 includes a module 612 and a module 614. The module 614 includes a blockchain 620 and a smart contract 630 (which may reside on the blockchain 620), that may execute any of the operational steps 608 (in module 612) included in any of the example embodiments. The steps/operations 608 may include one or more of the embodiments described or depicted and may represent output or written information that is written or read from one or more smart contracts 630 and/or blockchains 620. The physical infrastructure 610, the module 612, and the module 614 may include one or more computers, servers, processors, memories, and/or wireless communication devices. Further, the module 612 and the module 614 may be a same module.

Figure 6B:
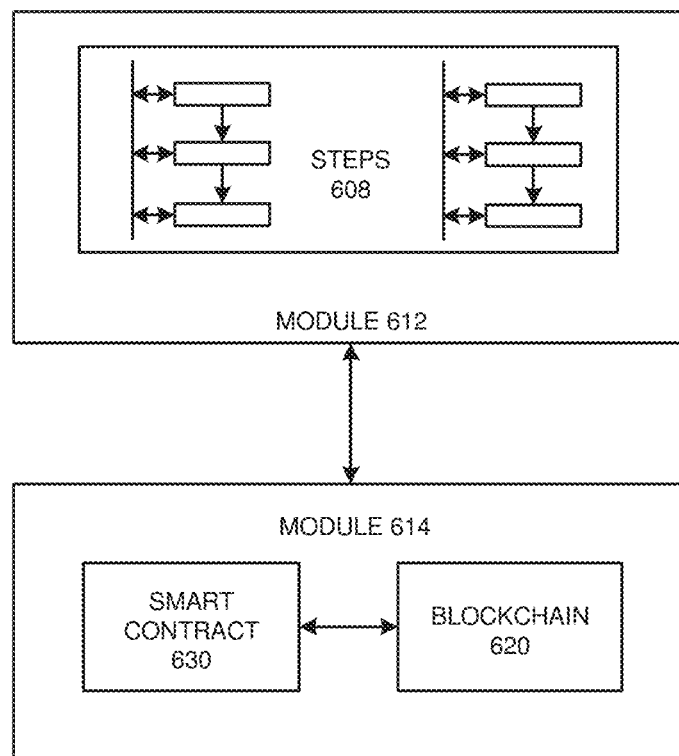
FIG. 6B is a diagram that illustrates another example system configured to perform one or more operations described herein, according to example embodiments.

FIG. 6B illustrates another example system 640 configured to perform various operations according to example embodiments. Referring to FIG. 6B, the system 640 includes a module 612 and a module 614. The module 614 includes a blockchain 620 and a smart contract 630 (which may reside on the blockchain 620), that may execute any of the operational steps 608 (in module 612) included in any of the example embodiments. The steps/operations 608 may include one or more of the embodiments described or depicted and may represent output or written information that is written or read from one or more smart contracts 630 and/or blockchains 620. In the examples of FIGS. 6A and 6B, the physical infrastructure 610, the module 612, and the module 614 may include one or more computers, servers, processors, memories, and/or wireless communication devices. Further, the module 612 and the module 614 may be a same module.

Figure 6C:
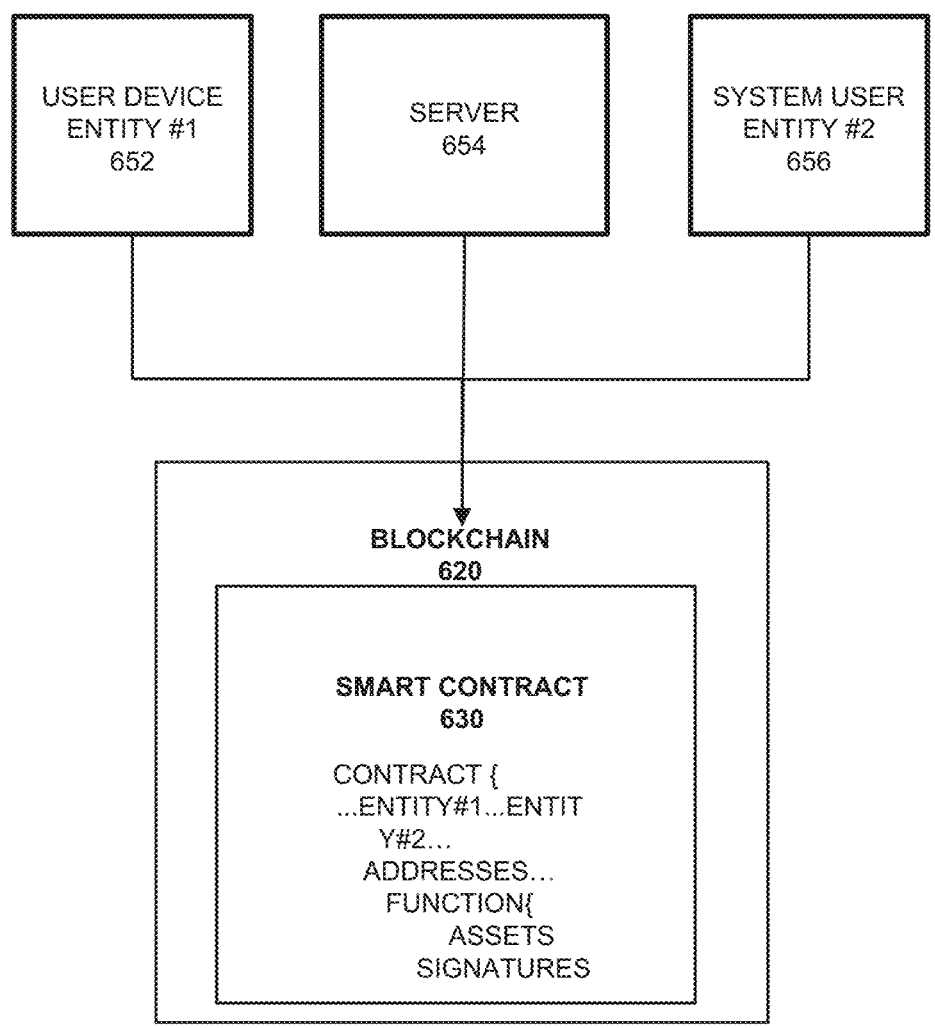
FIG. 6C is a diagram that illustrates a further example system configured to utilize a smart contract, according to example embodiments.

FIG. 6C illustrates an example system configured to utilize a smart contract configuration among contracting parties and a mediating server configured to enforce the smart contract terms on the blockchain according to example embodiments. Referring to FIG. 6C, the configuration 650 may represent a communication session, an asset transfer session or a process or procedure that is driven by a smart contract 630 which explicitly identifies one or more user devices 652 and/or 656. The execution, operations and results of the smart contract execution may be managed by a server 654. Content of the smart contract 630 may require digital signatures by one or more of the entities 652 and 656 which are parties to the smart contract transaction. The results of the smart contract execution may be written to a blockchain 620 as a blockchain transaction. The smart contract 630 resides on the blockchain 620 which may reside on one or more computers, servers, processors, memories, and/or wireless communication devices.

Figure 6D:
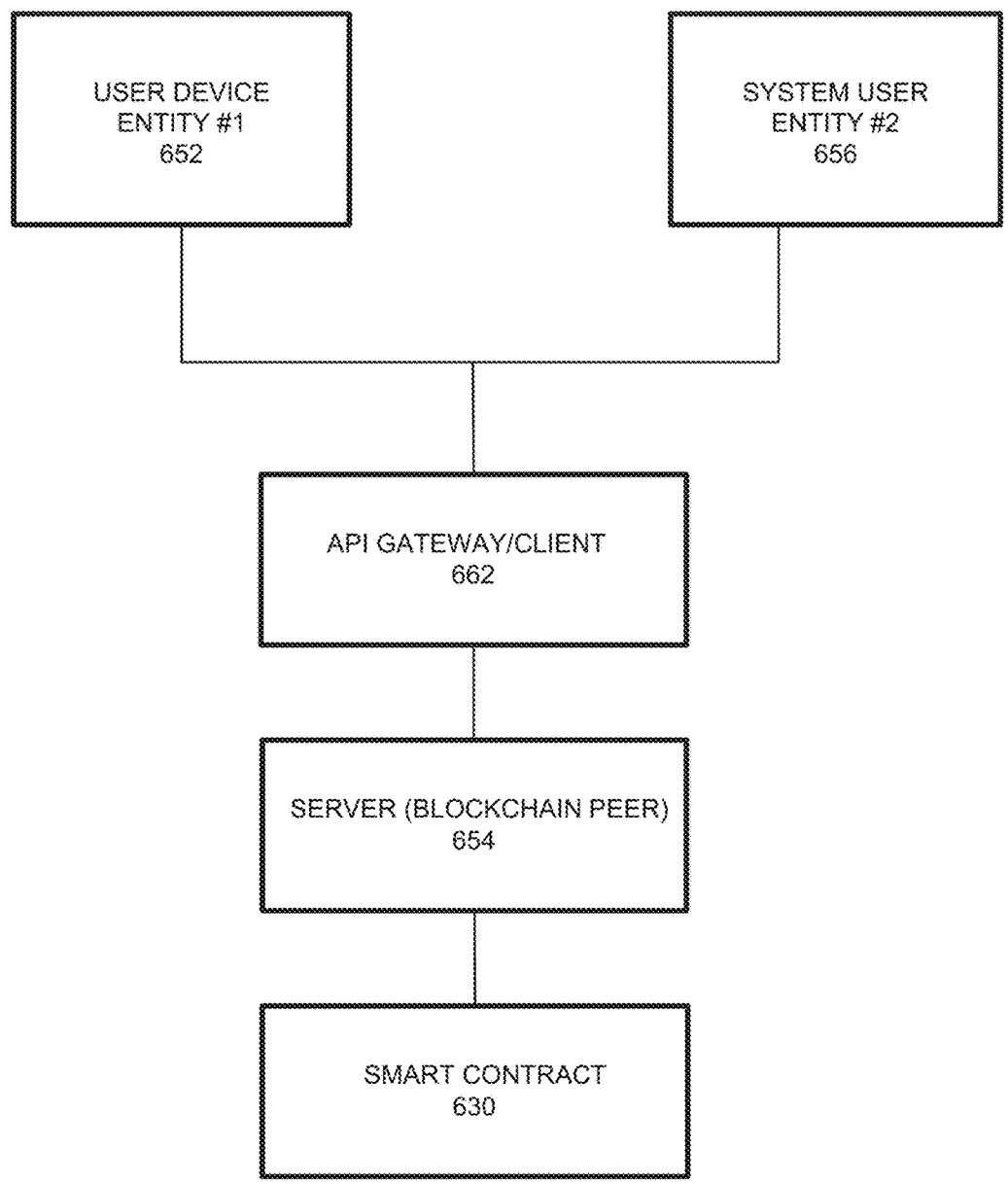
FIG. 6D is a diagram that illustrates yet another example system configured to utilize a blockchain, according to example embodiments.

FIG. 6D illustrates a system 660 including a blockchain, according to example embodiments. Referring to the example of FIG. 6D, an application programming interface (API) gateway 662 provides a common interface for accessing blockchain logic (e.g., smart contract 630 or other chaincode) and data (e.g., distributed ledger, etc.). In this example, the API gateway 662 is a common interface for performing transactions (invoke, queries, etc.) on the blockchain by connecting one or more entities 652 and 656 to a blockchain peer (i.e., server 654). Here, the server 654 is a blockchain network peer component that holds a copy of the world state and a distributed ledger allowing clients 652 and 656 to query data on the world state as well as submit transactions into the blockchain network where, depending on the smart contract 630 and endorsement policy, endorsing peers will run the smart contracts 630.

The above embodiments may be implemented in hardware, in a computer program executed by a processor, in firmware, or in a combination of the above. A computer program may be embodied on a computer readable medium, such as a storage medium. For example, a computer program may reside in random access memory ("RAM"), flash memory, read-only memory ("ROM"), erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

An exemplary storage medium may be coupled to the processor such that the processor may read information from, and write information to, the storage medium. In the alternative, the storage medium may be integral to the processor. The processor and the storage medium may reside in an application specific integrated circuit ("ASIC"). In the alternative, the processor and the storage medium may reside as discrete components.

Figure 7B:
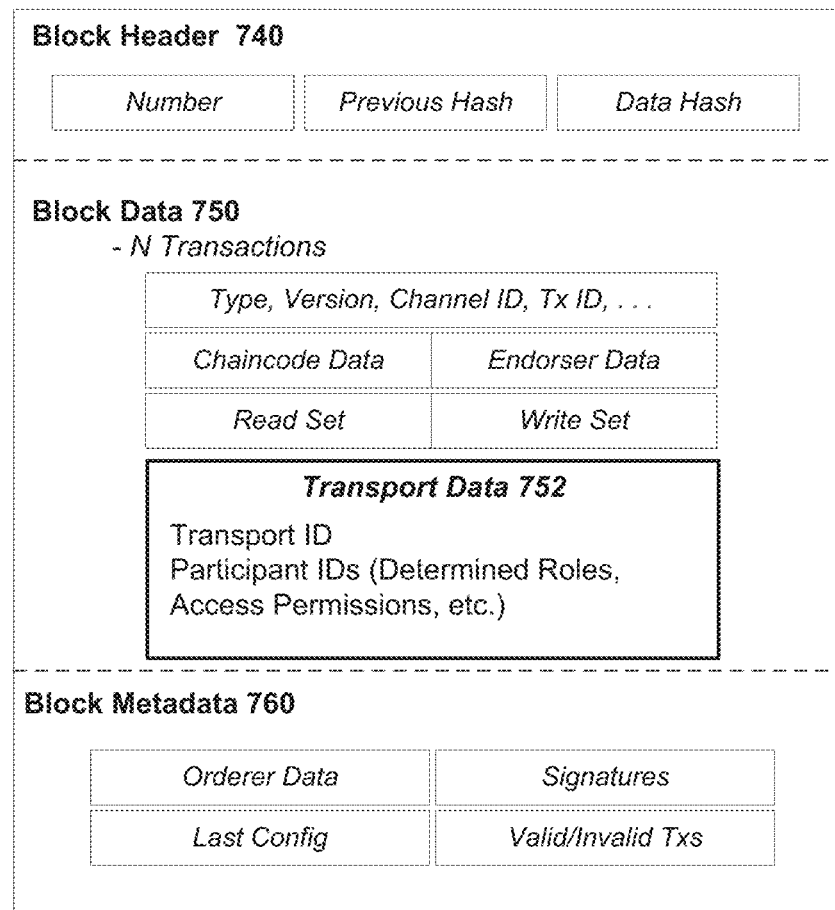
FIG. 7B is a diagram that illustrates contents of a new data block, according to example embodiments.

FIG. 7A illustrates a process 700 of a new block being added to a distributed ledger 720, according to example embodiments, and FIG. 7B illustrates contents of a new data block structure 730 for blockchain, according to example embodiments. Referring to FIG. 7A, clients (not shown) may submit transactions to blockchain nodes 711, 712, and/or 713. Clients may be instructions received from any source to enact activity on the blockchain 720. As an example, clients may be applications that act on behalf of a requester, such as a device, person or entity to propose transactions for the blockchain. The plurality of blockchain peers (e.g., blockchain nodes 711, 712, and 713) may maintain a state of the blockchain network and a copy of the distributed ledger 720. Different types of blockchain nodes/peers may be present in the blockchain network including endorsing peers which simulate and endorse transactions proposed by clients and committing peers which verify endorsements, validate transactions, and commit transactions to the distributed ledger 720. In this example, the blockchain nodes 711, 712, and 713 may perform the role of endorser node, committer node, or both.

The distributed ledger 720 includes a blockchain which stores immutable, sequenced records in blocks, and a state database 724 (current world state) maintaining a current state of the blockchain 722. One distributed ledger 720 may exist per channel and each peer maintains its own copy of the distributed ledger 720 for each channel of which they are a member. The blockchain 722 is a transaction log, structured as hash-linked blocks where each block contains a sequence of N transactions. Blocks may include various components and transactions such as shown in FIG. 7B. The linking of the blocks (shown by arrows in FIG. 7A) may be generated by adding a hash of a prior block's header within a block header of a current block. In this way, all transactions on the blockchain 722 are sequenced and cryptographically linked together preventing tampering with blockchain data without breaking the hash links. Furthermore, because of the links, the latest block in the blockchain 722 represents every transaction that has come before it. The blockchain 722 may be stored on a peer file system (local or attached storage), which supports an append-only blockchain workload.

The current state of the blockchain 722 and the distributed ledger 722 may be stored in the state database 724. Here, the current state data represents the latest values for all keys ever included in the chain transaction log of the blockchain 722. Chaincode invocations execute transactions against the current state in the state database 724. To make these chaincode interactions extremely efficient, the latest values of all keys are stored in the state database 724. The state database 724 may include an indexed view into the transaction log of the blockchain 722, it can therefore be regenerated from the chain at any time. The state database 724 may automatically get recovered (or generated if needed) upon peer startup, before transactions are accepted.

Endorsing nodes receive transactions from clients and endorse the transaction based on simulated results. Endorsing nodes hold smart contracts which simulate the transaction proposals. When an endorsing node endorses a transaction, the endorsing nodes creates a transaction endorsement which is a signed response from the endorsing node to the client application indicating the endorsement of the simulated transaction. The method of endorsing a transaction depends on an endorsement policy which may be specified within chaincode. An example of an endorsement policy is "the majority of endorsing peers must endorse the transaction". Different channels may have different endorsement policies. Endorsed transactions are forward by the client application to ordering service 710.

The ordering service 710 accepts endorsed transactions, orders them into a block, and delivers the blocks to the committing peers. For example, the ordering service 710 may initiate a new block when a threshold of transactions has been reached, a timer times out, or another condition. In the example of FIG. 7A, blockchain node 712 is a committing peer that has received a new data new data block 730 for storage on blockchain 720. The first block in the blockchain may be referred to as a genesis block which includes information about the blockchain, its members, the data stored therein, etc.

The ordering service 710 may be made up of a cluster of orderers. The ordering service 710 does not process transactions, smart contracts, or maintain the shared ledger. Rather, the ordering service 710 may accept the endorsed transactions and specifies the order in which those transactions are committed to the distributed ledger 720. The architecture of the blockchain network may be designed such that the specific implementation of 'ordering' (e.g., Solo, Kafka, BFT, etc.) becomes a pluggable component.

Transactions are written to the distributed ledger 720 in a consistent order. The order of transactions is established to ensure that the updates to the state database 724 are valid when they are committed to the network. Unlike a cryptocurrency blockchain system (e.g., Bitcoin, etc.) where ordering occurs through the solving of a cryptographic puzzle, or mining, in this example the parties of the distributed ledger 720 may choose the ordering mechanism that best suits that network.

When the ordering service 710 initializes a new data block 730, the new data block 730 may be broadcast to committing peers (e.g., blockchain nodes 711, 712, and 713). In response, each committing peer validates the transaction within the new data block 730 by checking to make sure that the read set and the write set still match the current world state in the state database 724. Specifically, the committing peer can determine whether the read data that existed when the endorsers simulated the transaction is identical to the current world state in the state database 724. When the committing peer validates the transaction, the transaction is written to the blockchain 722 on the distributed ledger 720, and the state database 724 is updated with the write data from the read-write set. If a transaction fails, that is, if the committing peer finds that the read-write set does not match the current world state in the state database 724, the transaction ordered into a block will still be included in that block, but it will be marked as invalid, and the state database 724 will not be updated.

Referring to FIG. 7B, a new data block 730 (also referred to as a data block) that is stored on the blockchain 722 of the distributed ledger 720 may include multiple data segments such as a block header 740, block data 750, and block metadata 760. It should be appreciated that the various depicted blocks and their contents, such as new data block 730 and its contents. shown in FIG. 7B are merely examples and are not meant to limit the scope of the example embodiments. The new data block 730 may store transactional information of N transaction(s) (e.g., 1, 10, 100, 500, 1000, 2000, 3000, etc.) within the block data 750. The new data block 730 may also include a link to a previous block (e.g., on the blockchain 722 in FIG. 7A) within the block header 740. In particular, the block header 740 may include a hash of a previous block's header. The block header 740 may also include a unique block number, a hash of the block data 750 of the new data block 730, and the like. The block number of the new data block 730 may be unique and assigned in various orders, such as an incremental/sequential order starting from zero.

The block data 750 may store transactional information of each transaction that is recorded within the new data block 730. For example, the transaction data may include one or more of a type of the transaction, a version, a timestamp, a channel ID of the distributed ledger 720, a transaction ID, an epoch, a payload visibility, a chaincode path (deploy tx), a chaincode name, a chaincode version, input (chaincode and functions), a client (creator) identify such as a public key and certificate, a signature of the client, identities of endorsers, endorser signatures, a proposal hash, chaincode events, response status, namespace, a read set (list of key and version read by the transaction, etc.), a write set (list of key and value, etc.), a start key, an end key, a list of keys, a Merkel tree query summary, and the like. The transaction data may be stored for each of the N transactions.

According to various embodiments, the block data 750 may also store downstream transport data 752 which may include an identifier of a shipment/transport, identifiers of the parties that are involved in the transport, roles of the parties, permissions to read and write granted to the parties (such as documents, event data, etc.) and the like. The transport data 752 may be used to verify that a user requesting access to transport information is allowed to access such data based on the permissions stored in the transport data 752. The transport data 752 includes one or more of the steps, features, processes and/or actions described or depicted herein. Accordingly, the transport data 752 can be stored in an immutable log of blocks on the distributed ledger 720. Some of the benefits of storing the transport data 752 on the blockchain are reflected in the various embodiments disclosed and depicted herein.

The block metadata 760 may store multiple fields of metadata (e.g., as a byte array, etc.). Metadata fields may include signature on block creation, a reference to a last configuration block, a transaction filter identifying valid and invalid transactions within the block, last offset persisted of an ordering service that ordered the block, and the like. The signature, the last configuration block, and the orderer metadata may be added by the ordering service 710. Meanwhile, a committer of the block (such as blockchain node 712) may add validity/invalidity information based on an endorsement policy, verification of read/write sets, and the like. The transaction filter may include a byte array of a size equal to the number of transactions in the block data 750 and a validation code identifying whether a transaction was valid/invalid. In some embodiments, although not shown in FIG. 7B, the block metadata 760 may store metadata of the recommended smart contracts there within.

Figure 7C:
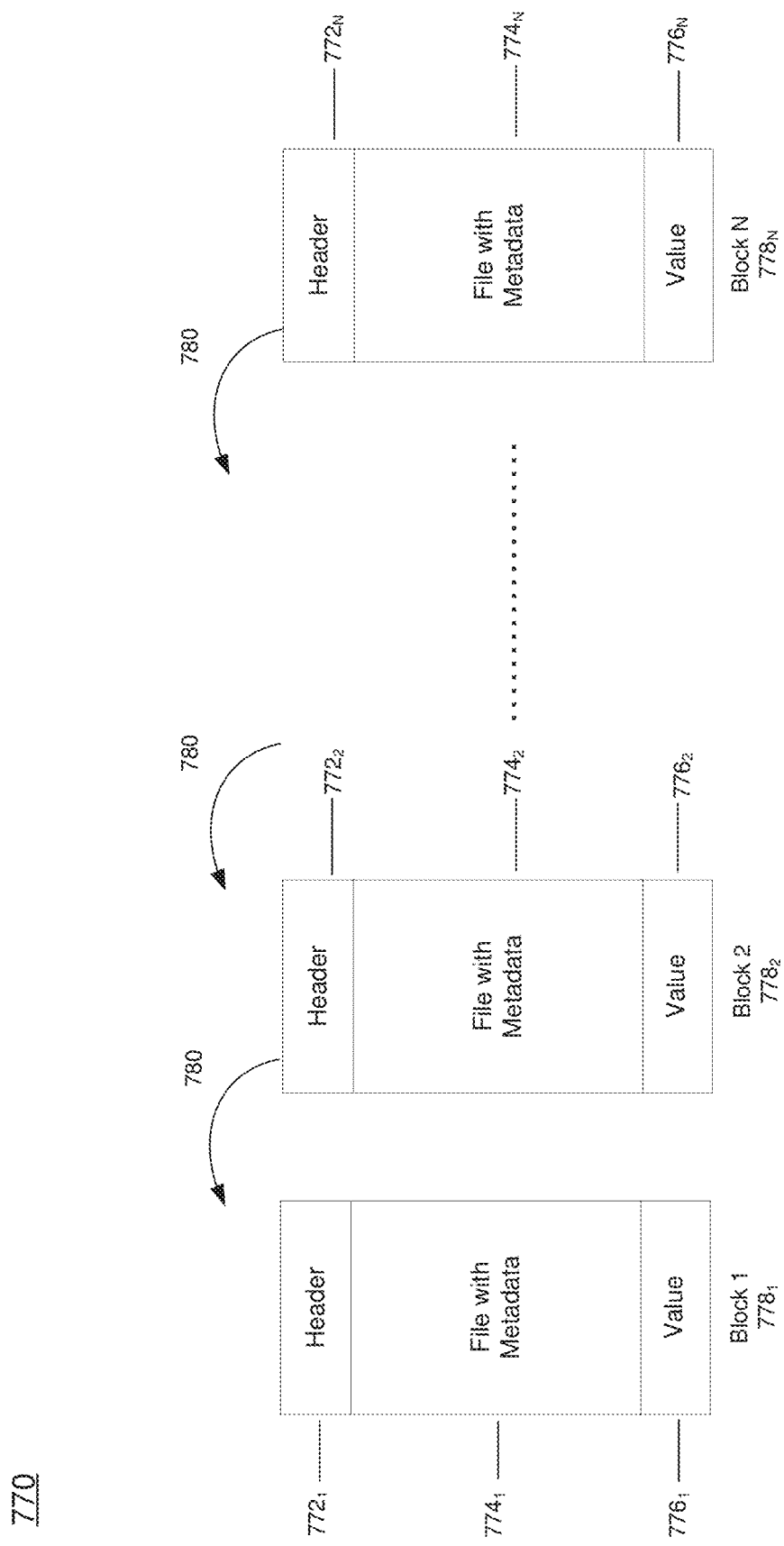
FIG. 7C is a diagram that illustrates a blockchain for digital content, according to example embodiments.

FIG. 7C illustrates an embodiment of a blockchain 770 for digital content in accordance with the embodiments described herein. The digital content may include one or more files and associated information. The files may include media, images, video, audio, text, links, graphics, animations, web pages, documents, or other forms of digital content. The immutable, append-only aspects of the blockchain serve as a safeguard to protect the integrity, validity, and authenticity of the digital content, making it suitable use in legal proceedings where admissibility rules apply or other settings where evidence is taken in to consideration or where the presentation and use of digital information is otherwise of interest. In this case, the digital content may be referred to as digital evidence.

The blockchain may be formed in various ways. In one embodiment, the digital content may be included in and accessed from the blockchain itself. For example, each block of the blockchain may store a hash value of reference information (e.g., header, value, etc.) along the associated digital content. The hash value and associated digital content may then be encrypted together. Thus, the digital content of each block may be accessed by decrypting each block in the blockchain, and the hash value of each block may be used as a basis to reference a previous block. This may be illustrated as follows:

| Block 1 | Block 2 | ... | Block N |
|---|---|---|---|
| Hash Value 1 | Hash Value 2 | | Hash Value N |
| Digital Content 1 | Digital Content 2 | | Digital Content N |

In one embodiment, the digital content may be not included in the blockchain. For example, the blockchain may store the encrypted hashes of the content of each block without any of the digital content. The digital content may be stored in another storage area or memory address in association with the hash value of the original file. The other storage area may be the same storage device used to store the blockchain or may be a different storage area or even a separate relational database. The digital content of each block may be referenced or accessed by obtaining or querying the hash value of a block of interest and then looking up that has value in the storage area, which is stored in correspondence with the actual digital content. This operation may be performed, for example, a database gatekeeper. This may be illustrated as follows:

| Blockchain | Storage Area | | |
|---|---|---|---|
| Block 1 Hash Value | Block 1 Hash Value | ... | Content |
| . | . | | |
| . | . | | |
| . | . | | |
| Block N Hash Value | Block N Hash Value | ... | Content |

In the example embodiment of FIG. 7C, the blockchain 770 includes a number of blocks $778_1$, $778_2$, ... $778_N$ cryptographically linked in an ordered sequence, where $N \geq 1$. The encryption used to link the blocks $778_1$, $778_2$, ... $778_N$ may be any of a number of keyed or un-keyed Hash functions. In one embodiment, the blocks $778_1$, $778_2$, ... $778_N$ are subject to a hash function which produces n-bit alphanumeric outputs (where n is 256 or another number) from inputs that are based on information in the blocks. Examples of such a hash function include, but are not limited to, a SHA-type (SHA stands for Secured Hash Algorithm) algorithm, Merkle-Damgard algorithm, HAIFA algorithm, Merkle-tree algorithm, nonce-based algorithm, and a non-collision-resistant PRF algorithm. In another embodiment, the blocks $778_1$, $778_2$, ..., $778_N$ may be cryptographically linked by a function that is different from a hash function. For purposes of illustration, the following description is made with reference to a hash function, e.g., SHA-2.

Each of the blocks $778_1, 778_2, \ldots, 778_N$ in the blockchain includes a header, a version of the file, and a value. The header and the value are different for each block as a result of hashing in the blockchain. In one embodiment, the value may be included in the header. As described in greater detail below, the version of the file may be the original file or a different version of the original file.

The first block $778_1$ in the blockchain is referred to as the genesis block and includes the header $772_1$, original file $774_1$, and an initial value $776_1$. The hashing scheme used for the genesis block, and indeed in all subsequent blocks, may vary. For example, all the information in the first block $778_1$ may be hashed together and at one time, or each or a portion of the information in the first block $778_1$ may be separately hashed and then a hash of the separately hashed portions may be performed.

The header $772_1$ may include one or more initial parameters, which, for example, may include a version number, timestamp, nonce, root information, difficulty level, consensus protocol, duration, media format, source, descriptive keywords, and/or other information associated with original file $774_1$ and/or the blockchain. The header $772_1$ may be generated automatically (e.g., by blockchain network managing software) or manually by a blockchain participant. Unlike the header in other blocks $778_2$ to $778_N$ in the blockchain, the header $772_1$ in the genesis block does not reference a previous block, simply because there is no previous block.

The original file $774_1$ in the genesis block may be, for example, data as captured by a device with or without processing prior to its inclusion in the blockchain. The original file $774_1$ is received through the interface of the system from the device, media source, or node. The original file $774_1$ is associated with metadata, which, for example, may be generated by a user, the device, and/or the system processor, either manually or automatically. The metadata may be included in the first block $778_1$ in association with the original file $774_1$.

The value $776_1$ in the genesis block is an initial value generated based on one or more unique attributes of the original file $774_1$. In one embodiment, the one or more unique attributes may include the hash value for the original file $774_1$, metadata for the original file $774_1$, and other information associated with the file. In one implementation, the initial value $776_1$ may be based on the following unique attributes:

1) SHA-2 computed hash value for the original file
2) originating device ID
3) starting timestamp for the original file
4) initial storage location of the original file
5) blockchain network member ID for software to currently control the original file and associated metadata The other blocks $778_2$ to $778_N$ in the blockchain also have headers, files, and values. However, unlike the first block $772_1$, each of the headers $772_2$ to $772_N$ in the other blocks includes the hash value of an immediately preceding block. The hash value of the immediately preceding block may be just the hash of the header of the previous block or may be the hash value of the entire previous block. By including the hash value of a preceding block in each of the remaining blocks, a trace can be performed from the Nth block back to the genesis block (and the associated original file) on a block-by-block basis, as indicated by arrows 780, to establish an auditable and immutable chain-of-custody.

Each of the header $772_2$ to $772_N$ in the other blocks may also include other information, e.g., version number, timestamp, nonce, root information, difficulty level, consensus protocol, and/or other parameters or information associated with the corresponding files and/or the blockchain in general.

The files $774_2$ to $774_N$ in the other blocks may be equal to the original file or may be a modified version of the original file in the genesis block depending, for example, on the type of processing performed. The type of processing performed may vary from block to block. The processing may involve, for example, any modification of a file in a preceding block, such as redacting information or otherwise changing the content of, taking information away from, or adding or appending information to the files.

Additionally, or alternatively, the processing may involve merely copying the file from a preceding block, changing a storage location of the file, analyzing the file from one or more preceding blocks, moving the file from one storage or memory location to another, or performing action relative to the file of the blockchain and/or its associated metadata. Processing which involves analyzing a file may include, for example, appending, including, or otherwise associating various analytics, statistics, or other information associated with the file.

The values in each of the other blocks $776_2$ to $776_N$ in the other blocks are unique values and are all different as a result of the processing performed. For example, the value in any one block corresponds to an updated version of the value in the previous block. The update is reflected in the hash of the block to which the value is assigned. The values of the blocks therefore provide an indication of what processing was performed in the blocks and also permit a tracing through the blockchain back to the original file. This tracking confirms the chain-of-custody of the file throughout the entire blockchain.

For example, consider the case where portions of the file in a previous block are redacted, blocked out, or pixelated in order to protect the identity of a person shown in the file. In this case, the block including the redacted file will include metadata associated with the redacted file, e.g., how the redaction was performed, who performed the redaction, timestamps where the redaction(s) occurred, etc. The metadata may be hashed to form the value. Because the metadata for the block is different from the information that was hashed to form the value in the previous block, the values are different from one another and may be recovered when decrypted.

Figure 7D:
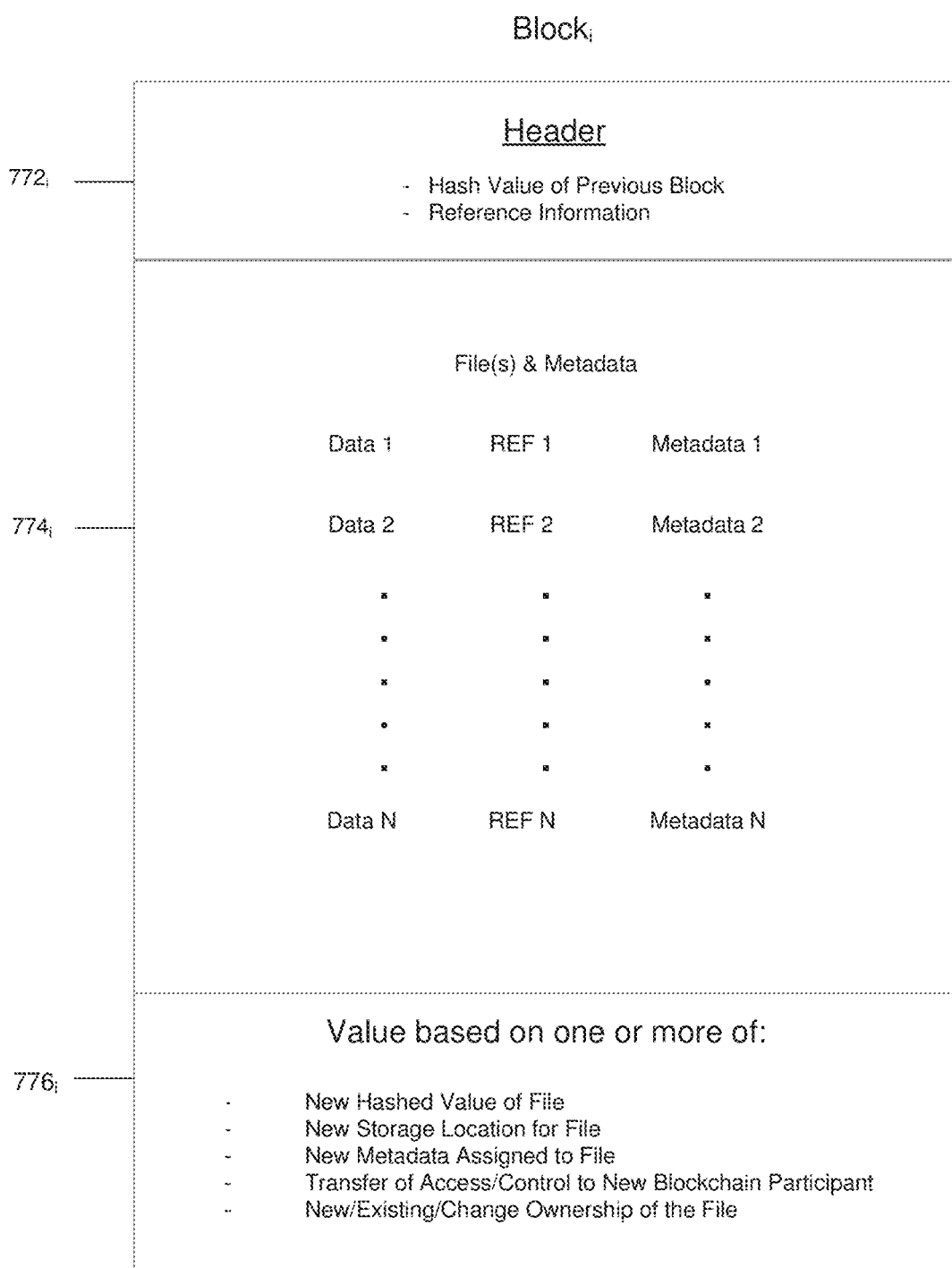
FIG. 7D is a diagram that illustrates a block which may represent the structure of blocks in the blockchain, according to example embodiments.

In one embodiment, the value of a previous block may be updated (e.g., a new hash value computed) to form the value of a current block when any one or more of the following occurs. The new hash value may be computed by hashing all or a portion of the information noted below, in this example embodiment.

a) new SHA-2 computed hash value if the file has been processed in any way (e.g., if the file was redacted, copied, altered, accessed, or some other action was taken)
b) new storage location for the file
c) new metadata identified associated with the file
d) transfer of access or control of the file from one blockchain participant to another blockchain participant FIG. 7D illustrates an embodiment of a block which may represent the structure of the blocks in the blockchain 790 in accordance with one embodiment. The block, $Block_{i-1}$, includes a header $772_i$, a file $774_i$, and a value $776_i$.

The header $772_i$ includes a hash value of a previous block $Block_{i-1}$ and additional reference information, which, for example, may be any of the types of information (e.g., header information including references, characteristics, parameters, etc.) discussed herein. All blocks reference the hash of a previous block except, of course, the genesis block. The hash value of the previous block may be just a hash of the header in the previous block or a hash of all or a portion of the information in the previous block, including the file and metadata.

The file $774_i$ includes a plurality of data, such as Data 1, Data 2, . . . , Data N in sequence. The data are tagged with metadata Metadata 1, Metadata 2, . . . , Metadata N which describe the content and/or characteristics associated with the data. For example, the metadata for each data may include information to indicate a timestamp for the data, process the data, keywords indicating the persons or other content depicted in the data, and/or other features that may be helpful to establish the validity and content of the file as a whole, and particularly its use a digital evidence, for example, as described in connection with an embodiment discussed below. In addition to the metadata, each data may be tagged with reference $REF_1$, $REF_2$, . . . , $REF_N$ to a previous data to prevent tampering, gaps in the file, and sequential reference through the file.

Once the metadata is assigned to the data (e.g., through a smart contract), the metadata cannot be altered without the hash changing, which can easily be identified for invalidation. The metadata, thus, creates a data log of information that may be accessed for use by participants in the blockchain.

The value $776_i$ is a hash value or other value computed based on any of the types of information previously discussed. For example, for any given block $Block_i$, the value for that block may be updated to reflect the processing that was performed for that block, e.g., new hash value, new storage location, new metadata for the associated file, transfer of control or access, identifier, or other action or information to be added. Although the value in each block is shown to be separate from the metadata for the data of the file and header, the value may be based, in part or whole, on this metadata in another embodiment.

Once the blockchain 770 is formed, at any point in time, the immutable chain-of-custody for the file may be obtained by querying the blockchain for the transaction history of the values across the blocks. This query, or tracking procedure, may begin with decrypting the value of the block that is most currently included (e.g., the last ($N^{th}$) block), and then continuing to decrypt the value of the other blocks until the genesis block is reached and the original file is recovered. The decryption may involve decrypting the headers and files and associated metadata at each block, as well.

Decryption is performed based on the type of encryption that took place in each block. This may involve the use of private keys, public keys, or a public key-private key pair. For example, when asymmetric encryption is used, blockchain participants or a processor in the network may generate a public key and private key pair using a predetermined algorithm. The public key and private key are associated with each other through some mathematical relationship. The public key may be distributed publicly to serve as an address to receive messages from other users, e.g., an IP address or home address. The private key is kept secret and used to digitally sign messages sent to other blockchain participants. The signature is included in the message so that the recipient can verify using the public key of the sender. This way, the recipient can be sure that only the sender could have sent this message.

Generating a key pair may be analogous to creating an account on the blockchain, but without having to actually register anywhere. Also, every transaction that is executed on the blockchain is digitally signed by the sender using their private key. This signature ensures that only the owner of the account can track and process (if within the scope of permission determined by a smart contract) the file of the blockchain.

Figure 8A:
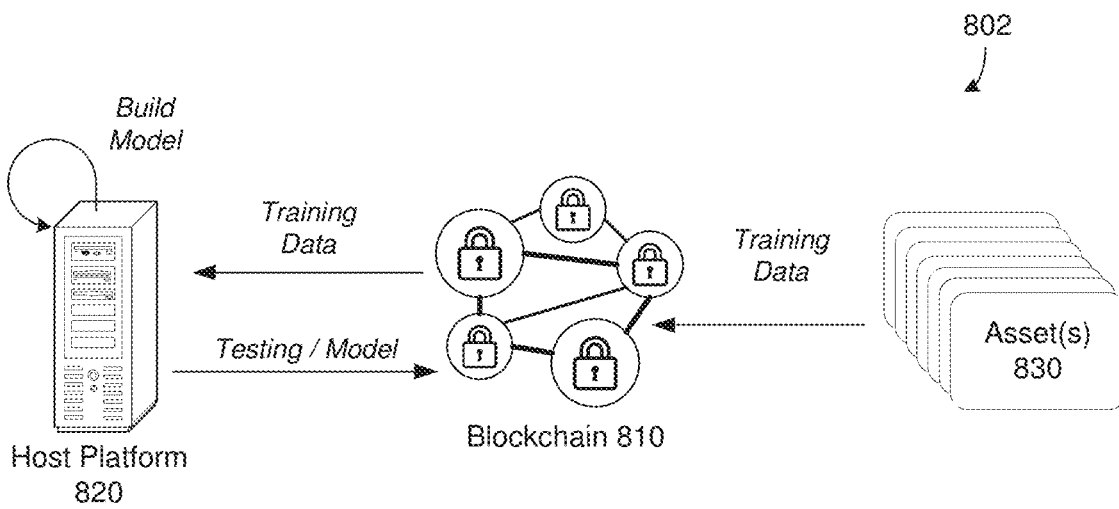
FIG. 8A is a diagram that illustrates an example blockchain which stores machine learning (artificial intelligence) data, according to example embodiments.
Figure 8A:
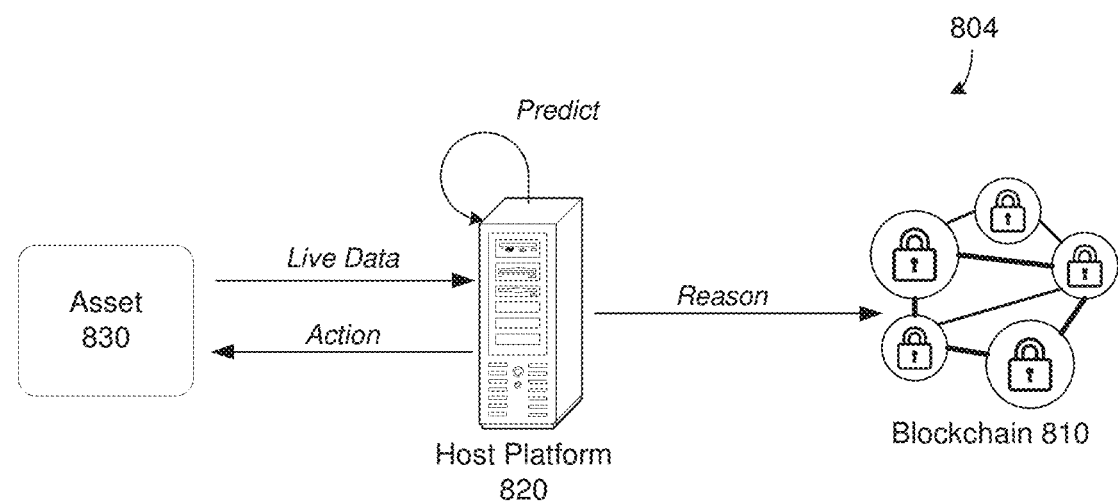
Figure 8B:
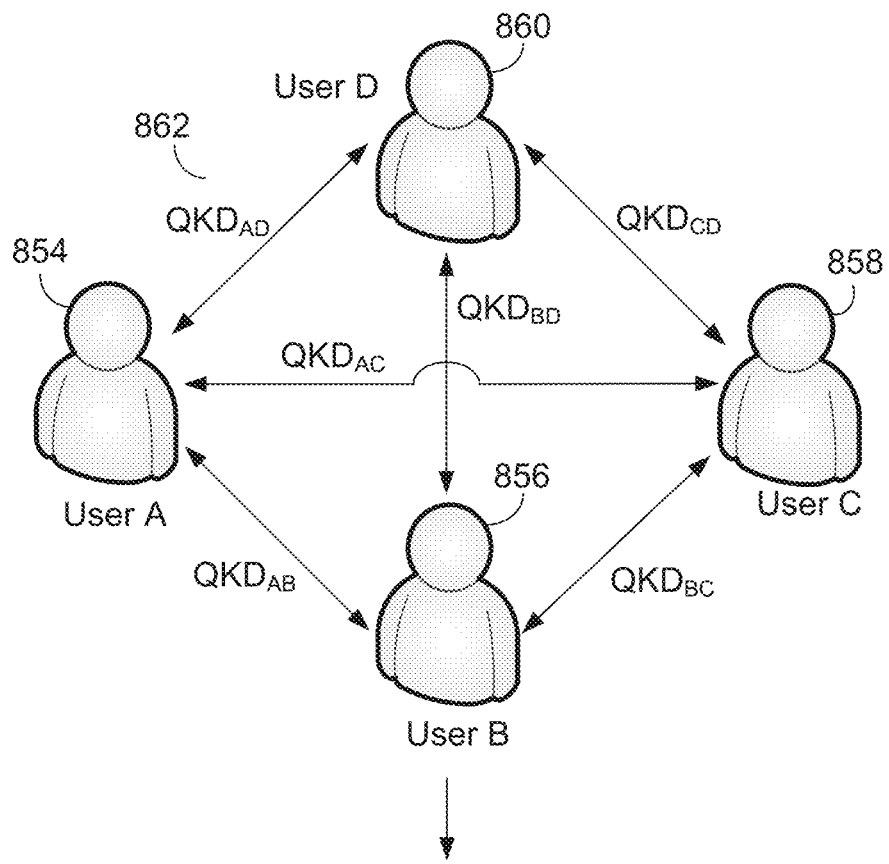
FIG. 8B is a diagram that illustrates an example quantum-secure blockchain, according to example embodiments.
Figure 8B:
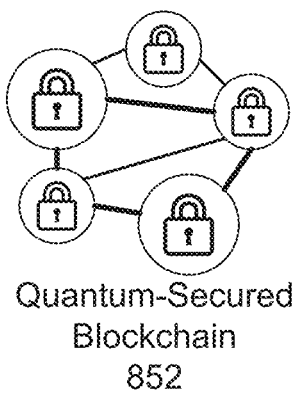

FIGS. 8A and 8B illustrate additional examples of use cases for blockchain which may be incorporated and used herein. In particular, FIG. 8A illustrates an example 800 of a blockchain 810 which stores machine learning (artificial intelligence) data. Machine learning relies on vast quantities of historical data (or training data) to build predictive models for accurate prediction on new data. Machine learning software (e.g., neural networks, etc.) can often sift through millions of records to unearth non-intuitive patterns.

In the example of FIG. 8A, a host platform 820 builds and deploys a machine learning model for predictive monitoring of assets 830. Here, the host platform 820 may be a cloud platform, an industrial server, a web server, a personal computer, a user device, and the like. Assets 830 can be any type of asset (e.g., machine or equipment, etc.) such as an aircraft, locomotive, turbine, medical machinery and equipment, oil and gas equipment, boats, ships, vehicles, and the like. As another example, assets 830 may be non-tangible assets such as stocks, currency, digital coins, insurance, or the like.

The blockchain 810 can be used to significantly improve both a training process 802 of the machine learning model and a predictive process 804 based on a trained machine learning model. For example, in 802, rather than requiring a data scientist/engineer or other user to collect the data, historical data may be stored by the assets 830 themselves (or through an intermediary, not shown) on the blockchain 810. This can significantly reduce the collection time needed by the host platform 820 when performing predictive model training. For example, using smart contracts, data can be directly and reliably transferred straight from its place of origin to the blockchain 810. By using the blockchain 810 to ensure the security and ownership of the collected data, smart contracts may directly send the data from the assets to the individuals that use the data for building a machine learning model. This allows for sharing of data among the assets 830.

The collected data may be stored in the blockchain 810 based on a consensus mechanism. The consensus mechanism pulls in (permissioned nodes) to ensure that the data being recorded is verified and accurate. The data recorded is time-stamped, cryptographically signed, and immutable. It is therefore auditable, transparent, and secure. Adding IoT devices which write directly to the blockchain can, in certain cases (i.e. supply chain, healthcare, logistics, etc.), increase both the frequency and accuracy of the data being recorded.

Furthermore, training of the machine learning model on the collected data may take rounds of refinement and testing by the host platform 820. Each round may be based on additional data or data that was not previously considered to help expand the knowledge of the machine learning model. In 802, the different training and testing steps (and the data associated therewith) may be stored on the blockchain 810 by the host platform 820. Each refinement of the machine learning model (e.g., changes in variables, weights, etc.) may be stored on the blockchain 810. This provides verifiable proof of how the model was trained and what data was used to train the model. Furthermore, when the host platform 820 has achieved a finally trained model, the resulting model may be stored on the blockchain 810.

After the model has been trained, it may be deployed to a live environment where it can make predictions/decisions based on the execution of the final trained machine learning model. For example, in 804, the machine learning model may be used for condition-based maintenance (CBM) for an asset such as an aircraft, a wind turbine, a healthcare machine, and the like. In this example, data fed back from the asset 830 may be input the machine learning model and used to make event predictions such as failure events, error codes, and the like. Determinations made by the execution of the machine learning model at the host platform 820 may be stored on the blockchain 810 to provide auditable/verifiable proof. As one non-limiting example, the machine learning model may predict a future breakdown/failure to a part of the asset 830 and create alert or a notification to replace the part. The data behind this decision may be stored by the host platform 820 on the blockchain 810. In one embodiment the features and/or the actions described and/or depicted herein can occur on or with respect to the blockchain 810.

New transactions for a blockchain can be gathered together into a new block and added to an existing hash value. This is then encrypted to create a new hash for the new block. This is added to the next list of transactions when they are encrypted, and so on. The result is a chain of blocks that each contain the hash values of all preceding blocks. Computers that store these blocks regularly compare their hash values to ensure that they are all in agreement. Any computer that does not agree, discards the records that are causing the problem. This approach is good for ensuring tamper-resistance of the blockchain, but it is not perfect.

One way to game this system is for a dishonest user to change the list of transactions in their favor, but in a way that leaves the hash unchanged. This can be done by brute force, in other words by changing a record, encrypting the result, and seeing whether the hash value is the same. And if not, trying again and again and again until it finds a hash that matches. The security of blockchains is based on the belief that ordinary computers can only perform this kind of brute force attack over time scales that are entirely impractical, such as the age of the universe. By contrast, quantum computers are much faster (1000s of times faster) and consequently pose a much greater threat.

FIG. 8B illustrates an example 850 of a quantum-secure blockchain 852 which implements quantum key distribution (QKD) to protect against a quantum computing attack. In this example, blockchain users can verify each other's identities using QKD. This sends information using quantum particles such as photons, which cannot be copied by an eavesdropper without destroying them. In this way, a sender and a receiver through the blockchain can be sure of each other's identity.

In the example of FIG. 8B, four users are present 854, 856, 858, and 860. Each of pair of users may share a secret key 862 (i.e., a QKD) between themselves. Since there are four nodes in this example, six pairs of nodes exists, and therefore six different secret keys 862 are used including $QKD_{AB}$, $QKD_{AC}$, $QKD_{AD}$, $QKD_{BC}$, $QKD_{BD}$, and $QKD_{CD}$. Each pair can create a QKD by sending information using quantum particles such as photons, which cannot be copied by an eavesdropper without destroying them. In this way, a pair of users can be sure of each other's identity.

The operation of the blockchain 852 is based on two procedures (i) creation of transactions, and (ii) construction of blocks that aggregate the new transactions. New transactions may be created similar to a traditional blockchain network. Each transaction may contain information about a sender, a receiver, a time of creation, an amount (or value) to be transferred, a list of reference transactions that justifies the sender has funds for the operation, and the like. This transaction record is then sent to all other nodes where it is entered into a pool of unconfirmed transactions. Here, two parties (i.e., a pair of users from among 854-860) authenticate the transaction by providing their shared secret key 862 (QKD). This quantum signature can be attached to every transaction making it exceedingly difficult to tamper with. Each node checks their entries with respect to a local copy of the blockchain 852 to verify that each transaction has sufficient funds. However, the transactions are not yet confirmed.

Rather than perform a traditional mining process on the blocks, the blocks may be created in a decentralized manner using a broadcast protocol. At a predetermined period of time (e.g., seconds, minutes, hours, etc.) the network may apply the broadcast protocol to any unconfirmed transaction thereby to achieve a *Byzantine* agreement (consensus) regarding a correct version of the transaction. For example, each node may possess a private value (transaction data of that particular node). In a first round, nodes transmit their private values to each other. In subsequent rounds, nodes communicate the information they received in the previous round from other nodes. Here, honest nodes are able to create a complete set of transactions within a new block. This new block can be added to the blockchain 852. In one embodiment the features and/or the actions described and/or depicted herein can occur on or with respect to the blockchain 852.

Figure 9:
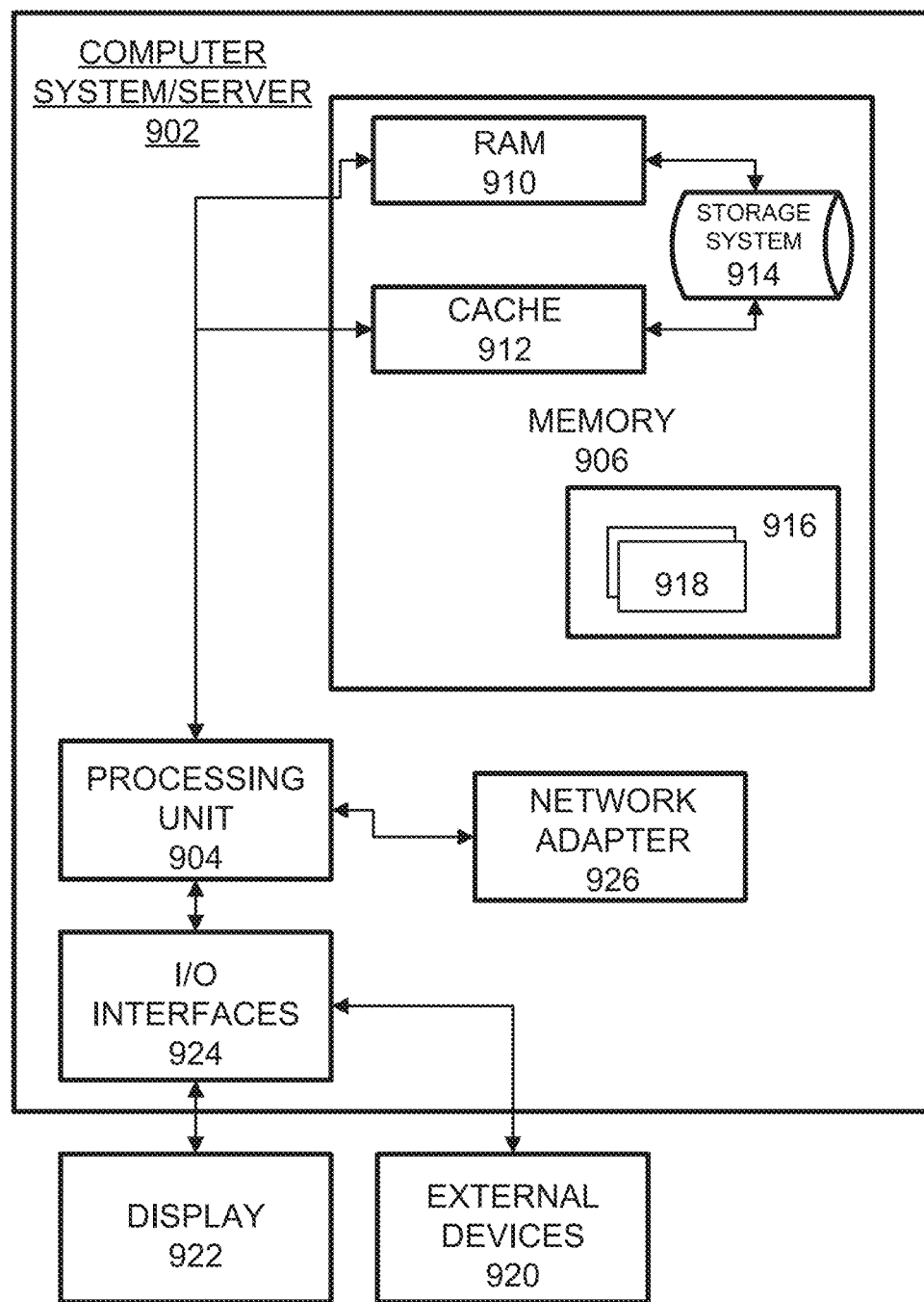
FIG. 9 is a diagram that illustrates an example system that supports one or more of the example embodiments.

FIG. 9 illustrates an example system 900 that supports one or more of the example embodiments described and/or depicted herein. The system 900 comprises a computer system/server 902, which is operational with numerous other general purpose or special purpose computing system environments or configurations. Examples of well-known computing systems, environments, and/or configurations that may be suitable for use with computer system/server 902 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 902 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 902 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 9, computer system/server 902 in cloud computing node 900 is shown in the form of a general-purpose computing device. The components of computer system/server 902 may include, but are not limited to, one or more processors or processing units 904, a system memory 906, and a bus that couples various system components including system memory 906 to processor 904.

The bus represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 902 typically includes a variety of computer system readable media. Such media may be any available media that is accessible by computer system/server 902, and it includes both volatile and non-volatile media, removable and non-removable media. System memory 906, in one embodiment, implements the flow diagrams of the other figures. The system memory 906 can include computer system readable media in the form of volatile memory, such as random-access memory (RAM) 910 and/or cache memory 912. Computer system/server 902 may further include other removable/non-removable, volatile/non-volatile computer system storage media. By way of example only, storage system 914 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to the bus by one or more data media interfaces. As will be further depicted and described below, memory 906 may include at least one program product having a set (e.g., at least one) of program modules that are configured to carry out the functions of various embodiments of the application.

Program/utility 916, having a set (at least one) of program modules 918, may be stored in memory 906 by way of example, and not limitation, as well as an operating system, one or more application programs, other program modules, and program data. Each of the operating system, one or more application programs, other program modules, and program data or some combination thereof, may include an implementation of a networking environment. Program modules 918 generally carry out the functions and/or methodologies of various embodiments of the application as described herein.

As will be appreciated by one skilled in the art, aspects of the present application may be embodied as a system, method, or computer program product. Accordingly, aspects of the present application may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present application may take the form of a computer program product embodied in one or more computer readable medium(s) having computer readable program code embodied thereon.

Computer system/server 902 may also communicate with one or more external devices 920 such as a keyboard, a pointing device, a display 922, etc.; one or more devices that enable a user to interact with computer system/server 902; and/or any devices (e.g., network card, modem, etc.) that enable computer system/server 902 to communicate with one or more other computing devices. Such communication can occur via I/O interfaces 924. Still yet, computer system/server 902 can communicate with one or more networks such as a local area network (LAN), a general wide area network (WAN), and/or a public network (e.g., the Internet) via network adapter 926. As depicted, network adapter 926 communicates with the other components of computer system/server 902 via a bus. It should be understood that although not shown, other hardware and/or software components could be used in conjunction with computer system/server 902. Examples, include, but are not limited to: microcode, device drivers, redundant processing units, external disk drive arrays, RAID systems, tape drives, and data archival storage systems, etc.

Although an exemplary embodiment of at least one of a system, method, and non-transitory computer readable medium has been illustrated in the accompanied drawings and described in the foregoing detailed description, it will be understood that the application is not limited to the embodiments disclosed, but is capable of numerous rearrangements, modifications, and substitutions as set forth and defined by the following claims. For example, the capabilities of the system of the various figures can be performed by one or more of the modules or components described herein or in a distributed architecture and may include a transmitter, receiver or pair of both. For example, all or part of the functionality performed by the individual modules, may be performed by one or more of these modules. Further, the functionality described herein may be performed at various times and in relation to various events, internal or external to the modules or components. Also, the information sent between various modules can be sent between the modules via at least one of: a data network, the Internet, a voice network, an Internet Protocol network, a wireless device, a wired device and/or via plurality of protocols. Also, the messages sent or received by any of the modules may be sent or received directly and/or via one or more of the other modules.

One skilled in the art will appreciate that a "system" could be embodied as a personal computer, a server, a console, a personal digital assistant (PDA), a cell phone, a tablet computing device, a smartphone or any other suitable computing device, or combination of devices. Presenting the above-described functions as being performed by a "system" is not intended to limit the scope of the present application in any way but is intended to provide one example of many embodiments. Indeed, methods, systems and apparatuses disclosed herein may be implemented in localized and distributed forms consistent with computing technology.

It should be noted that some of the system features described in this specification have been presented as modules, in order to more particularly emphasize their implementation independence. For example, a module may be implemented as a hardware circuit comprising custom very large-scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, comprise one or more physical or logical blocks of computer instructions that may, for instance, be organized as an object, procedure, or function. Nevertheless, the executables of an identified module need not be physically located together but may comprise disparate instructions stored in different locations which, when joined logically together, comprise the module and achieve the stated purpose for the module. Further, modules may be stored on a computer-readable medium, which may be, for instance, a hard disk drive, flash device, random access memory (RAM), tape, or any other such medium used to store data.

Indeed, a module of executable code could be a single instruction, or many instructions, and may even be distributed over several different code segments, among different programs, and across several memory devices. Similarly, operational data may be identified and illustrated herein within modules and may be embodied in any suitable form and organized within any suitable type of data structure. The operational data may be collected as a single data set or may be distributed over different locations including over different storage devices, and may exist, at least partially, merely as electronic signals on a system or network.

It will be readily understood that the components of the application, as generally described and illustrated in the figures herein, may be arranged and designed in a wide variety of different configurations. Thus, the detailed description of the embodiments is not intended to limit the scope of the application as claimed but is merely representative of selected embodiments of the application.

One having ordinary skill in the art will readily understand that the above may be practiced with steps in a different order, and/or with hardware elements in configurations that are different than those which are disclosed. Therefore, although the application has been described based upon these preferred embodiments, it would be apparent to those of skill in the art that certain modifications, variations, and alternative constructions would be apparent.

While preferred embodiments of the present application have been described, it is to be understood that the embodiments described are illustrative only and the scope of the application is to be defined solely by the appended claims when considered with a full range of equivalents and modifications (e.g., protocols, hardware devices, software platforms etc.) thereto.

What is claimed is:

1. An apparatus comprising:
   a network interface configured to receive transport data of a multi-party transport process; and
   a processor configured to:
   identify documents and events that are associated with the multi-party transport process based on the transport data,
   dynamically determine read and write permissions for the documents and the events of the multi-party transport process based on predefined roles of participants of the multi-party transport process, an origin of the multi-party transport process, a destination of the multi-party transport process, and an intermediate location of the multi-party transport process, and
   store an identifier of the multi-party transport process and the read and write permissions in a block on a blockchain.

2. The apparatus of claim 1, wherein the processor is configured to:
   derive permissions to read and write data to the blockchain for a plurality of parties included in the multi-party transport process based on predefined roles that are mapped to the parties by chaincode of the blockchain.

3. The apparatus of claim 1, wherein the processor is further configured to:
   receive a request to access one or more of a document and an event of the multi-party transport process, and
   grant the request based on the dynamically determined read and write permissions stored in the blockchain.

4. The apparatus of claim 1, wherein the processor is further configured to:
   receive a request to access one or more of a document and an event of the multi-party transport process, and
   deny the request based on the dynamically determined read and write permissions stored in the blockchain.

5. The apparatus of claim 1, wherein the network interface is further configured to:
   receive an update of event data of the multi-party process, and
   store the update of event data and read and write permissions for the update of event data in a block on the blockchain.

6. The apparatus of claim 5, wherein the update of event data comprises a modification to a previously stored document.

7. The apparatus of claim 5, wherein the update of event data comprises a modification to previously determined read and write permissions to an event and its data.

8. A method comprising:
   receiving transport data of a multi-party transport process;
   identifying documents and events that are associated with the multi-party transport process based on the received transport data;
   dynamically determining read and write permissions for the documents and the events of the multi-party transport process based on predefined roles of participants of the multi-party transport process, an origin of the multi-party transport process, a destination of the multi-party transport process, and an intermediate location of the multi-party transport process; and
   storing an identifier of the multi-party transport process and the read and write permissions in a block on a blockchain.

9. The method of claim 8, wherein the dynamically determining further comprises:
   deriving permissions to read and write data to the blockchain for a plurality of parties included in the multi-party transport process based on predefined roles that are mapped to the parties by chaincode of the blockchain.

10. The method of claim 8, further comprising:
    receiving a request to access one or more of a document and an event of the multi-party transport process, and
    granting the request based on the dynamically determined read and write permissions stored in the blockchain.

11. The method of claim 8, further comprising:
    receiving a request to access one or more of a document and an event of the multi-party transport process, and
    denying the request based on the dynamically determined read and write permissions stored in the blockchain.

12. The method of claim 8, further comprising:
    receiving an update of event data of the multi-party process, and
    storing the update of event data and read and write permissions for the update of event data in a block on the blockchain.

13. The method of claim 12, wherein the update of event data comprises a modification to a previously stored document.

14. The method of claim 12, wherein the update of event data comprises a modification to previously determined read and write permissions to an event and its data.

15. A non-transitory computer-readable medium comprising one or more instructions that when executed by a processor, cause the processor to perform a method comprising:

receiving transport data of a multi-party transport process;

identifying documents and events that are associated with the multi-party transport process based on the received transport data;

dynamically determining read and write permissions for the documents and the events of the multi-party transport process based on predefined roles of participants of the multi-party transport process, an origin of the multi-party transport process, a destination of the multi-party transport process, and an intermediate location of the multi-party transport process; and storing an identifier of the multi-party transport process and the read and write permissions in a block on a blockchain.

16. The non-transitory computer-readable medium of claim 15, wherein the dynamically determining further comprises:

deriving permissions to read and write data to the blockchain for a plurality of parties included in the multi-party transport process based on predefined roles that are mapped to the parties by chaincode of the blockchain.

17. The non-transitory computer-readable medium of claim 15, wherein the one or more instructions further causes the processor to perform:

receiving a request to access one or more of a document and an event of the multi-party transport process, and granting the request based on the dynamically determined read and write permissions stored in the blockchain.

18. The non-transitory computer-readable medium of claim 15, wherein the one or more instructions further causes the processor to perform:

receiving a request to access one or more of a document and an event of the multi-party transport process, and denying the request based on the dynamically determined read and write permissions stored in the blockchain.

\* \* \* \* \*